(12) United States Patent
Chmora et al.

(10) Patent No.: US 11,818,271 B2
(45) Date of Patent: Nov. 14, 2023

(54) LINKING TRANSACTIONS

(71) Applicant: "ENKRI HOLDING", LIMITED LIABILITY COMPANY, Voronezh (RU)

(72) Inventors: Andrey Lvovich Chmora, Moscow (RU); Roman Anatolievich Nekrasov, Moscow (RU); Igor Sergeevich Bityutskikh, Voronezh (RU)

(73) Assignee: "ENKRI HOLDING", LIMITED LIABILITY COMPANY, Voronezh (RU)

(*) Notice: Subject to any disclaimer, the term of this patent is extended or adjusted under 35 U.S.C. 154(b) by 392 days.

(21) Appl. No.: 17/284,278

(22) PCT Filed: Oct. 10, 2018

(86) PCT No.: PCT/RU2018/000671
§ 371 (c)(1),
(2) Date: Apr. 9, 2021

(87) PCT Pub. No.: WO2020/076178
PCT Pub. Date: Apr. 16, 2020

(65) Prior Publication Data
US 2021/0391996 A1    Dec. 16, 2021

(51) Int. Cl.
*H04L 9/32* (2006.01)
*G06F 16/27* (2019.01)
(Continued)

(52) U.S. Cl.
CPC ............ *H04L 9/3239* (2013.01); *G06F 16/27* (2019.01); *G06F 21/64* (2013.01); *H04L 9/3073* (2013.01); *H04L 9/3247* (2013.01); *H04L 9/50* (2022.05)

(58) Field of Classification Search
CPC ... H04L 9/3239; H04L 9/3073; H04L 9/3247; H04L 9/50; H04L 9/3236; G06F 16/27; G06F 21/64
See application file for complete search history.

(56) References Cited

U.S. PATENT DOCUMENTS 10,540,654 B1 * 1/2020 James ................. G06Q 20/223
11,200,569 B1 * 12/2021 James ................. G06Q 20/381
(Continued)

OTHER PUBLICATIONS

V. Vallois and F. A. Guenane, "Bitcoin transaction: From the creation to validation, a protocol overview," 2017 1st Cyber Security in Networking Conference (CSNet), Rio de Janeiro, Brazil, 2017, pp. 1-7, doi: 10.1109/CSNET.2017.8241988. (Year: 2017).*
(Continued)

*Primary Examiner* — Khalid M Almaghayreh
(74) *Attorney, Agent, or Firm* — Muncy, Geissler, Olds & Lowe, P.C.

(57) ABSTRACT

The invention relates, in general, to the field of computer engineering and, in particular, to arranging and storing information in the form of interlinked transactions in a distributed computer framework. The technology for linking transactions is provided. Transactions include information on public keys, as well as credentials of owners of these public keys. Public keys which belong to one owner are linked into a logical chain at the level of transactions. Each transaction contains information on one public key. Transactions are signed by a digital signature. Transactions are preliminarily placed into a specialized pool, then they are retrieved from the pool, verified, and, upon successful verification, data form the transactions is placed into a public ledger (blockchain). The verification comprises verifying the digital signature and confirming linkability or, in other words, confirming that a transaction belongs to a particular chain. Anyone having access to the ledger can perform all
(Continued)

the necessary verifications. The invention provides decentralized storage and management of public keys, thereby enabling to minimize risks inherent to the commonly known centralized approach.

20 Claims, 12 Drawing Sheets

(51) Int. Cl.
*G06F 21/64* (2013.01)
*H04L 9/30* (2006.01)
*H04L 9/00* (2022.01)

(56) References Cited

U.S. PATENT DOCUMENTS

| | | | | |
|---|---|---|---|---|
| 11,308,487 | B1* | 4/2022 | Foster | G06Q 20/3829 |
| 2017/0005804 | A1* | 1/2017 | Zinder | H04L 9/3239 |
| 2017/0286951 | A1* | 10/2017 | Ignatchenko | G06Q 20/3823 |
| 2018/0294967 | A1* | 10/2018 | Roberts | H04L 9/3255 |
| 2018/0330348 | A1* | 11/2018 | Uhr | G06Q 20/36 |
| 2018/0330349 | A1* | 11/2018 | Uhr | H04L 9/0643 |
| 2019/0019180 | A1* | 1/2019 | Coburn | H04L 9/0637 |
| 2019/0130391 | A1* | 5/2019 | Wright | G06Q 20/389 |
| 2019/0325432 | A1* | 10/2019 | Ow | G06Q 20/3678 |
| 2020/0104836 | A1* | 4/2020 | Coburn | G06Q 20/36 |

OTHER PUBLICATIONS

Lamport, Leslie, "Password authentication with insecure communication", Communications of the ACM, Association For Computing Machinery, Inc, United States, vol. 24, Issue No. 11, Nov. 1, 1981 (Nov. 1, 1981), pp. 770-772, (XP-058263014).

Fromknecht,Conner, "CertCoin: A NameCoin Based Decentralized Authentication System 6.857 Class Project", Mar. 14, 2014, URL:https://courses.csail.mit.edu/6.857/2014/files/19-fromknecht-velicann-yakoubov-certcoin.pdf (XP-055586502).

Antonopoulos, Andreas M, "Mastering Bitcoin - Unlocking Digital CryptoCurrencies",Dec. 1, 2014, pp. 1-282, URL:httpsi/lunglueit-files.s3.amazonaws. c0m/ebf/050674f4f31840f0a87306ea1400028dp(f (XP-055581333).

* cited by examiner

LINKING TRANSACTIONS

FIELD OF THE INVENTION

The present invention relates, in general, to the field of computer engineering, and, more particularly, to arranging and storing information in the form of interlinked transactions in a distributed computer framework.

BACKGROUND OF THE INVENTION

The modern stage of global development of technologies is characterized by storing and processing significant amounts of data related to various fields of human activities, where electronic data exchange is of massive nature and has various forms and modalities. There is a category of critical data with special requirements for storage and processing in view of inadmissibility of unauthorized access to such data for the purpose of malicious usage thereof. Various cryptographic techniques are employed to protect such data, especially when it is exchanged electronically. Asymmetric cryptography based on a public/private cryptographic key pair, e.g. digital signature (DS) schemes, such as ECDSA, GOST R 34.10-2012, and encryption schemes, such as RSA, and others have become widespread.

Therefore, particular attention is paid to storage and usage of cryptographic keys. It is obvious that disclosure of a private cryptographic key or successful impersonification of a public key owner can provide a malicious individual(s) with access to encrypted information, which may lead to catastrophic consequences.

The modern approach suggests deploying a Public Key Infrastructure (PKI) which is necessary for authentication of public cryptographic keys used in various operations of asymmetric cryptography. Authenticity is ensured by the technology of digital certificates.

The existing PKI concept is based on the paradigm of centralization where a Certificate Authority (CA) is responsible for issuing and maintaining digital certificates; in addition, an important role is played by Registration Authorities (RAs), as well as servers responsible for providing information on a current certificate status via OCSP, and other infrastructure elements. The fundamental premise is that anyone who uses the technology of digital certificates to authenticate public keys should trust said PKI entities. Disadvantages of the centralized approach are obvious: compromise of the trusted entities results in large-scale negative consequences for the entire PKI user community and other parties involved.

Thus, there is a need in the art for technical solutions to forgo the centralization principle and transition to a decentralized public key infrastructure (DPKI).

SUMMARY OF THE INVENTION

It is an object of the present invention to provide a technology for arranging and storing information on public cryptographic key in the form of interlinked transactions in a distributed computer framework that would enable to avoid the disadvantages outlined above and thereby improve reliability of circulation of public cryptographic keys.

According to the first aspect, a computer-implemented method is provided for arranging and storing information as interlinked transactions in a distributed computer framework, the distributed computer framework comprising, at least:

a public pool intended for preliminarily placing transactions thereinto, the pool enabling to modify information present therein, as well as add information thereto and remove information therefrom;

a public distributed ledger (blockchain) intended for storing therein records generated based on transactions from the pool, said ledger enabling to both add information thereto and read information therefrom, without any possibility of modifying information in the ledger or removing information from the ledger, all the records in the ledger being linked by the blockchain technology (i.e. blockchain-linked) into a chain, wherein transactions included in different records are also linked into logical transaction chains, wherein a root of each transaction chain is a zeroth transaction in the transaction chain;

participant computing devices capable of communicating with the pool and the ledger; and at least one verifier computing device responsible for reading transactions from the pool and placing data from the transactions into the ledger.

The method comprises generating a transaction chain.

To this end, at least the following steps are performed in at least one participant computing device from said participant computing devices.

For a zeroth transaction of the transaction chain, wherein the zeroth transaction includes six fields, where: a first field of the zeroth transaction is preferably empty, a second field of the zeroth transaction is intended for a check value, a third field of the zeroth transaction is intended for an address of an e-wallet, a fourth field of the zeroth transaction is intended for credentials of a wallet owner, a fifth field of the zeroth transaction is intended for a wallet public key, and a sixth field of the zeroth transaction is intended for a digital signature (DS) of the zeroth transaction;

placing the e-wallet address an into the third field of the zeroth transaction, the e-wallet address being expressed by a value of a first cryptographic hash function of a wallet public key, wherein the wallet public key is paired with a wallet private key, placing the wallet owner credentials into the fourth field of the zeroth transaction, and placing the wallet public key into the fifth field of the zeroth transaction;

computing a zeroth (0th) concatenated value which represents a value of the first hash function of a concatenation of data from the third, fourth, and fifth fields of the zeroth transaction;

performing iterative hashing by means of obtaining a hashing result of a zeroth iteration ($RES^0(0)$) by applying the first hash function to a concatenation of a first secret seed and the zeroth concatenated value, and by means of successively obtaining a hashing result of each k-th iteration ($RES^0(k)$), $0<k\leq n$, by applying the first hash function to a concatenation of a hashing result of a (k−1)-th iteration ($RES^0(k-1)$) and the zeroth concatenated value, where n is a maximum number of iterations which is preferably predefined for the first secret seed;

according to a first embodiment, performing a zeroth buffering step comprising storing $RES^0(n-1)$ to long-term memory accessible to said at least one participant computing device;

placing $RES^0(n)$ as the check value of the zeroth transaction into the second field of the zeroth transaction;

computing the digital signature of the zeroth transaction based on data from the first, second, third, fourth, and fifth fields of the zeroth transaction and the wallet private key, and placing the digital signature of the zeroth transaction into the sixth field of the zeroth transaction;

placing the zeroth transaction into the pool.

For each i-th, i>0 transaction of the transaction chain, the i-th transaction including six fields, where: a first field of the i-th transaction is intended for a link value, a second field of the i-th transaction is intended for a check value, a third field and a fourth field of the i-th transaction are intended for information content, a fifth field of the i-th transaction is intended for a service public key, and a sixth field of the i-th transaction is intended for a digital signature for the i-th transaction, placing the information content of the i-th transaction into the third field and the fourth field of the i-th transaction, the information content having at least partial relation to a first participant, and placing the service public key into the fifth field of the i-th transaction, wherein the service public key is paired with a service private key, said service key pair being the same for the entire transaction chain;

computing an i-th concatenated value which is a value of the first hash function of a concatenation of data from the third, fourth, and fifth fields of the i-th transaction;

performing iterative hashing by means of obtaining a hashing result of a zeroth iteration ($RES^i(0)$) by applying the first hash function to a concatenation of the first secret seed and the i-th concatenated value, and by means of successively obtaining a hashing result of each k-th iteration ($RES^i(k)$), $0<k\leq n-i$, by applying the first hash function to a concatenation of a hashing result of a (k−1)-th iteration ($RES^i(k-1)$) and the i-th concatenated value;

according to the first embodiment, performing an i-th buffering step comprising storing $RES^i(n-i-1)$ to the long-term memory;

placing $RES^i(n-i)$ as the check value of the i-th transaction into the second field of the i-th transaction;

according to the first embodiment, reading $RES^{i-1}(n-i)$ from the long-term memory, or according to a second embodiment, computing an (i−1)-th concatenated value, the (i−1)-th concatenated value being a value of the first hash function of a concatenation of data from a third, fourth, and fifth fields of an (i−1)-th transaction, said data has been preferably read from the ledger, and performing iterative hashing by means of obtaining a hashing result of a zeroth iteration ($RES^{i-1}(0)$) by applying the first hash function to a concatenation of the first secret seed and the (i−1)-th concatenated value, and by means of successively obtaining a hashing result of each k-th iteration ($RES^{i-1}(k)$), $0<k\leq n-i$, by applying the first hash function to a concatenation of a hashing result of a (k−1)-th iteration ($RES^{i-1}(k-1)$) and the (i−1)-th concatenated value;

placing $RES^{i-1}(n-i)$ as the link value of the i-th transaction into the first field of the i-th transaction;

computing the digital signature for the i-th transaction based on data from the first, second, third, fourth, and fifth fields of the i-th transaction, the service private key, and the wallet private key, and placing the digital signature for the i-th transaction into the sixth field of the i-th transaction;

placing the i-th transaction into the pool.

Thereafter, at least the following steps are performed in the verifier computing device, retrieving the zeroth transaction from the pool, verifying validity of the digital signature of the zeroth transaction, and, if validity of the digital signature of the zeroth transaction is acknowledged, placing the data from the fields of the zeroth transaction into the ledger;

successively retrieving each i-th, i>0, transaction from the pool, and performing verification with respect thereto, the verification comprising:

verifying validity of the digital signature for the i-th transaction, and, if validity of the digital signature for the i-th transaction is acknowledged, acknowledging linkability of the i-th transaction if a check value from a second field of the (i−1)-th transaction, said value has been preferably read from the ledger, matches a value of the first hash function of a concatenation of the link value from the first field of the i-th transaction and the value of the first hash function of the concatenation of the data from the third, fourth, and fifth fields of the (i−1)-th transaction, said data has been preferably read from the ledger;

placing the data from the fields of the i-th transaction into the ledger if validity of the digital signature for the i-th transaction and linkability of the i-th transaction are acknowledged.

According to one preferable embodiment, the information arranged and stored as the interlinked transactions in the distributed computer framework is information on public cryptographic keys; said participants are owners of key material; the third field of the i-th transaction is intended for key material, and the fourth field of the i-th transaction is intended for credentials of an owner of the key material; the placing the information content of the i-th transaction into the third and fourth fields of the i-th transaction comprises placing, into the third field of the i-th transaction, a value of the first hash function of an i-th ordinary public key, wherein the i-th ordinary public key is paired with an i-th ordinary private key, and placing, into the fourth field of the i-th transaction, credentials of the first participant who is an owner of the i-th ordinary public/private key pair, wherein said service key pair may be different from any of ordinary key pairs. The first hash function is preferably a combined hash function implemented as a combination of cryptographic hash functions $SHA_{256}$ and $RIPEMD_{160}$ as follows:

$$y=RIPEMD_{160}(SHA_{256}(x)),$$

wherein the first secret seed is preferably pseudo-random. Bitlength of the first, second, and third fields of each transaction is fixed and equals 160 bits, whereas bitlengths of the fourth and sixth fields of each transaction can be variable, wherein the fourth field of each transaction comprises a set of attributes of a respective owner.

According to one preferred embodiment, the service private key is computed by iterative hashing, the iterative hashing comprising repeatedly applying a second cryptographic hash function to a result of previous hashing, starting from hashing a second secret seed, wherein multipleness of the hashing is defined by a number of different chains of one participant, and each individual hashing determines a service private key for a specific chain, while a public service key paired therewith is computed based on said service private key. The second hash function may differ from the first hash function, and the second secret seed may differ from the first secret seed.

According to one preferred embodiment, the computing the digital signature of the zeroth transaction is performed based on applying a predefined cryptographic transformation to the concatenation of the data from the first, second, third, fourth, and fifth fields of the zeroth transaction using the wallet private key.

According to a first preferred embodiment, said at least one participant computing device is a computing device of the first participant, said first participant possessing the first secret seed, the service private key, and the wallet private key, wherein said computing the digital signature for the i-th transaction is performed by applying a predefined cryptographic transformation to the concatenation of the data from the first, second, third, fourth, and fifth fields of the i-th transaction using the service private key and the wallet private key.

According to a second preferred embodiment, said at least one participant computing device comprises a computing device of the first participant and a computing device of a second participant, the first participant being subordinate to the second participant, wherein the first participant possesses the first secret seed and the service private key, while the second participant possesses the wallet private key;

the computing the digital signature for the i-th transaction further comprising:

sending, from the computing device of the first participant to the computing device of the second participant, a request for generating a wallet digital signature ($DS_{wal}^i$), in the computing device of the first participant, computing a digital signature of the i-th transaction ($DS_{trx}^i$) based on applying a predefined cryptographic transformation to the concatenation of the data from the first, second, third, fourth, and fifth fields of the i-th transaction using the service private key; and in the computing device of the second participant, in response to acceptance of the received request:

verifying validity of $DS_{trx}^i$, using the service public key, and if validity of $DS_{trx}^i$ is acknowledged, computing $DS_{wal}^i$ based on applying the predefined cryptographic transformation to the concatenation of the data from the first, second, third, fourth, and fifth fields of the i-th transaction and $DS_{trx}^i$ using the wallet private key, said placing the digital signature for the i-th transaction into the sixth field of the i-th transaction comprising jointly placing both $DS_{trx}^i$ and $DS_{wal}^i$ into the sixth field of the i-th transaction.

According to the first or second preferred embodiment, the method further comprises, in the verifier computing device:

prior to said verifying validity of the digital signature of the zeroth transaction retrieved from the pool, comparing the wallet public key from the fifth field of the zeroth transaction and a true wallet public key, the comparing being performed within a secure environment in the verifier computing device, wherein a condition to proceed to said verifying validity of the digital signature of the zeroth transaction is acknowledgement, in said comparing, of identity of the wallet public key from the zeroth transaction to the true wallet public key;

prior to the verifying validity of a digital signature of the first transaction retrieved from the pool, comparing the service public key from a fifth field of the first transaction and a true service public key, said comparing being performed within the secure environment in the verifier computing device, wherein a condition to proceed to said verifying validity of the digital signature for the first transaction is acknowledgement, in said comparing, of identity of the service public key from the first transaction with the true service public key; and for each i-th transaction, i>1, retrieved from the pool, prior to said verifying validity of the digital signature for the i-th transaction, comparing the service public key from the fifth field of the i-th transaction with a service public key read from the ledger, wherein said service key read from the ledger was placed into the ledger from the fifth field of the m-th transaction belonging to said transaction chain, m having any value from 1 to i−1, said comparing being performed within the secure environment in the verifier computing device, wherein a condition to proceed to said verifying validity of the digital signature for the i-th transaction is acknowledgement, in said comparing, of identity of the service public key from the i-th transaction with the service public key read from the ledger.

Furthermore, the true public key is preferably retrieved from a data storage, and a further condition to proceed to the verifying validity of the digital signature for the zeroth transaction, provided identity of the wallet public key from the zeroth transaction to the true wallet public key is acknowledged, preferably is identity of the value from the third field of the zeroth transaction to a value of the first hash function of any of these wallet public keys.

According to the first preferred embodiment, said verifying validity of the digital signature for the i-th transaction comprises performing concatenation of the data from the first, second, third, fourth, and fifth fields of the i-th transaction, and verifying validity of the digital signature for the i-th transaction based on said concatenation, the wallet public key and the service public key from the fifth field of the i-th transaction.

According to the second preferred embodiment, said verifying validity of the digital signature for the i-th transaction comprises:

performing first concatenation of the data from the first, second, third, fourth, and fifth fields of the i-th transaction and $DS_{trx}^i$, and verifying validity of $DS_{wal}^i$ based on the first concatenation, and performing second concatenation of the data from the first, second, third, fourth, and fifth fields of the i-th transaction, and verifying validity of $DS_{trx}^i$ based on the second concatenation and the service public key from the fifth field of the i-th transaction.

Preferably, the method further comprises retrieving the wallet public key from the data storage, or reading from the ledger a public key which was placed into the ledger from the fifth field of the zeroth transaction upon successful verification of the zeroth transaction.

According to one preferred embodiment, the e-wallet is a specialized account responsible for accruing/spending money, wherein the placing the data from each transaction into the ledger is accompanied by debiting an appropriate commission fee from the e-wallet address.

According to one preferred embodiment, n≥3, and the method further comprises, before starting execution of said steps with respect to the i-th, i>0, transaction in said at least one participant computing device, a step of, when (n−i)=2, reinitializing the transaction chain by changing the first secret seed. Said reinitializing may further comprise changing n.

According to the second aspect, the present invention provides a distributed computer framework where the method according to the first aspect is implemented.

The claimed subject matter provides decentralized storage and management of public keys, thereby minimizing risks typical to the conventional centralized approach.

It should be noted that the techniques disclosed herein are applicable not only to key information—similarly, they can be applied to arranging and storing other information content significant to other applications. In particular, information content arranged and stored in the form of interlinked transactions in a distributed computer framework can represent information related to messages exchanged within a messenger; in this case, a value of the hash function (preferably, said combined hash function) of an individual message is placed into the third field of each non-zeroth transaction, whereas metadata of the message is placed into its fourth field.

DETAILED DESCRIPTION OF EMBODIMENTS OF THE INVENTION

1. Summary 1.1. DPKI and PKI

Figure 1:
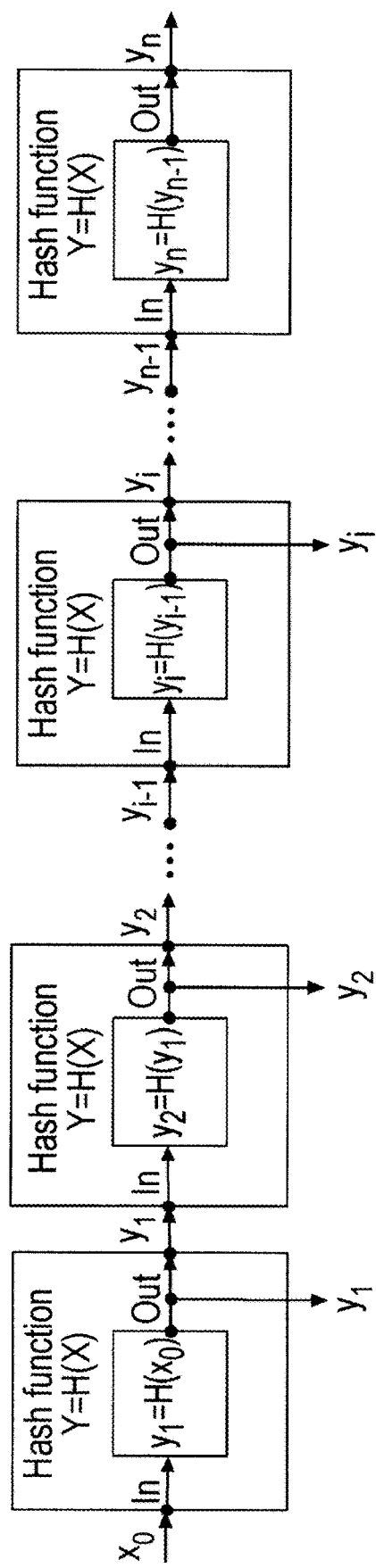
FIG. 1—an illustrative schematic view of iterative hashing.

In the most common sense, the trusted entities of the centralized PKI are responsible for:

verifying identity of a requestor (i.e. substantially the one who is presenting a public key and stating that he or she is the owner of this key);

profiling a public key certificate (i.e. filling the certificate with up-to-date information);

issuing the public key certificate for the requestor whose identity has been reliably confirmed;

changing a status of the public key certificate;

providing information on the current status of the public key certificate.

The above-listed actions are referred to as services that the PKI provides to its customers.

Decentralization does not imply presence of trusted entities. Therefore, in order to preserve functionality, it is necessary to provide decentralized methods for implementing the services from the set given above.

The strategic idea is to forgo the concept of digital certificates and utilize a distributed ledger (blockchain) to store information on public keys. The blockchain technology is known from the art (see, e.g., Wattenhofer R. The science of the blockchain. Inverted Forest Publishing, 2016; Swan M. Blockchain: Blueprint for a New Economy. O'Reilly Media, Inc., 2015; Morabito Vincenzo. Business Innovation Through Blockchain. The $B^3$ Perspective. Springer, 2017; Gaur N. et al. Hands-On Blockchain with Hyperledger: Building decentralized applications with Hyperledger Fabric and Composer. Packt Publishing, 2018, ISBN 978-178899452; Dhillon V., Metcalf D., Hooper M. Blockchain Enabled Applications: Understand the Blockchain Ecosystem and How to Make it Work for You. Apress, 2017, ISBN 978-1-4842-3080-0; Bashir Imran. Mastering Blockchain. Packt, 2017, ISBN 978-1-78712-544-5; Furneaux N. Investigating Cryptocurrencies: Understanding, Extracting, and Analyzing Blockchain Evidence. Wiley, 2018, ISBN 1119480582; Norton Jared. Blockchain: Easiest Ultimate Guide To Understand Blockchain. CreateSpace Independent Publishing Platform, 2016) and widely used nowadays.

General approaches to implementing the basic set of DPKI services can be formulated as follows:

1. Verification of identity of a requestor is carried out post factum by joint efforts of the community of DPKI users.

2. Every requestor performs the profiling himself/herself independently by filling a form during registration.

3. As a result, information on a public key is stored in a ledger record linked to all the other ledger records.

4. Only the owner is authorized to change the status of the public key.

5. Anyone can get access to the distributed ledger and verify the current status of the public key.

In accordance with the aforesaid, the PKI has used, as a container to store a public key, a digital certificate issued by the Certificate Authority (CA). In the proposed decentralized approach information about a public key, along with credentials of its owner and other metadata, is stored in the distributed ledger. As follows from the above provisions, there are no trusted entities in the DPKI, and the desired functionality is implemented with the help of both individual users and communities of users united by the principle of common purpose. Such a technological solution has its own advantages:

history of operations with public keys is maintained;

persistence (unchangeability) of stored information is provided.

The DPKI is characterized by a simple architecture which is based on the distributed ledger. The ledger can be used both to store information on actual public keys and to store information on canceled (revoked) keys, and other status changes. It is possible to simultaneously use multiple ledgers of different purposes: e.g. the one ledger contains information on public keys, and the other ledger contains information on the current status of these keys.

1.2. General Approach

In the context of storing information on a public key in the ledger (see item 3 above), an owner (i.e. substantially the one who owns private keys and registers information on public keys which are paired therewith) generates a transaction based on the information on the public key and auxiliary data, said transaction being stored in a specialized public pool. It should be explained that the term "transaction", as used herein, refers to a plurality of data fields including, inter alia, information content relevant to the problem being solved, said information content, in the present case related to cryptographic keys, is key information and account information. More specifically, each transaction includes, inter alia, information on one public key and credentials of an owner of said key. When creating a new record of the distributed ledger, an interested third party (referred to as "verifier" in the present application) retrieves a transaction from the pool and subjects it to verification. A decision to place data from the transaction into a record linked to all the other records in the ledger is taken by the verifier based on a positive result of the verification.

The abovementioned pool and ledger are different in terms of vulnerability of information. In particular, the ledger consists of records that can be added, but can not be deleted or modified. Every new record added to the end of the ledger is inextricably linked to all the other records in the ledger. The linking is achieved by applying a cryptographic hash function. This means that, in order to modify a specific record, for example, for tampering information, it is required to apply the respective modifications to all subsequent records in the ledger, which results in practically an unfeasible amount of computations. Information can be added to/deleted from the pool, pre-existing information can also be modified. Information is therefore vulnerable as long as it is in the public pool, and becomes invulnerable once it is in the ledger. Thus, the owner's objective is to ensure that the information remains unchanged until it is placed into the ledger. This objective is formulated in the context of a potential attacker's intention to modify the information through various malicious actions which depend on his or her strategy.

The present application solves the problem of linking transactions. As noted above, transactions include information on public keys, as well as credentials of owners of those keys. Public keys which belong to one owner are linked into a logical chain on the level on transactions. Each transaction contains information on one public key. Each transaction is signed by a digital signature which is included in one of its fields. Transactions are preliminarily deposited into the specialized public pool, then the transactions are retrieved from the pool, verified, and, in the case of successful verification, placed into the public ledger. The verification comprises verifying the digital signature and confirming linkability or, in other words, pertinence of a transaction to a particular chain. Anyone having access to the ledger can perform all the necessary verifications.

1.3. Iterative Hashing

The known procedure of iterative hashing which is illustrated in FIG. 1 is used to link transactions according to the present invention. As follows from FIG. 1, the iterative transformation comprises successively applying a cryptographic hash function $y=H(x)$ in such a way that in an i-th iteration an $(i-1)$-th output value is provided to input of the hash function in order to compute an i-th output value. Formally, the transformation is as follows:

$$y_n = \underbrace{H_{n-1}(H_{n-2}(\ldots H_1(H_0(x_0))\ldots))}_{n \text{ times}}$$

Parameters of the procedure include a start value $x_0$ and a number n of iterations. A final value $y_n$ is generated as a result of the transformation. It should be noted that the values $y_i$, $n \geq i \geq 0$, can be stored in a long-term memory.

The transformation being considered has the following properties:

Property 1. The final value $y_n$, as well as all intermediate values $y_i$, can be obtained only by the one who knows the start value $x_0$. If some intermediate value $y_j$ is known, then, by construction, $\{y_{j+1}, y_{j+2}, \ldots, y_n\}$ are also known.

Property 2. In order to obtain $y_{i-1}$ at given $y_i$, $n \geq i > 0$, but unknown $x_0$, it is required to invert the hash function, in particular, to compute $y_{i-1}=H^{-1}(y_i)$. The inversion $x=H^{-1}(y)$ for the cryptographic hash function $y=H(x)$ causes solving a computationally complex problem with exponential amount of searches.

Property 3. Assume $y_i=H_{i-1}(H_{i-2}(\ldots H_1(H_0(x_0)))\ldots)$ is given. Then it is easy to determine that $y_{i-1}=H_{i-2}(H_{i-3}(\ldots H_1(H_0(x_0)))\ldots)$ belongs to the chain with the final value $y_n$. To this end, it is sufficient to compute $y'=H(y_{i-1})$. If $y'=y_i$, then $y_{i-1}$ belongs to the chain.

1.4. Commission Fee

It should be noted that placement of information from a transaction into the ledger is accompanied by charging a commission fee in the form of cryptocurrency units/subunits or the like, e.g. crypto tokens. The commission fee implies that all transactions must be associated with an address of a particular wallet, i.e. a special account responsible for accruing/spending money. As used herein, the term "wallet address" refers to a value of a hash function of a public key included by a wallet private/public key pair specially designed to this end, as well as an asymmetric cryptographic transformation where said keys are involved. It should be noticed that the wallet public key and a value of the hash function thereof are stored in respective fields of a zeroth transaction $Trx_0$ which forms the root of the transaction chain. Each of other transactions in the transaction chain, $Trx_j$, $j>0$, includes a value of the hash function of a public key, from a public/private key pair, the information on which is registered by the owner. Such pair of public/private keys is hereinafter referred to as a pair of ordinary public/private keys, so that they are meaningfully distinguished from other public/private keys involved in the present invention (in particular, from the abovementioned wallet public/private keys). Thus, all transactions of the owner are linked into a single transaction chain with $Trx_0$ being the root of said chain.

Therefore, the present document provides a set of technical solutions which ensure integrity and authenticity of:
a plurality of data fields within a single transaction;
an individual transaction chain.

2. Distributed Computer Framework

An exemplary embodiment of a distributed computer framework 200 where the present invention is implemented is described below with reference to FIG. 2.

The framework 200 includes a public pool 210, a public distributed ledger (blockchain) 220, participant computing devices 230-1, 230-2, . . . , 230-N commonly referred to as 230, and one or more verifier computing devices 240. As a matter of course, the distributed computer framework 200 may also include other components (e.g., various data storage devices/databases, auxiliary communication devices, etc.).

As noted above, prior to placing data from a transaction(s) into the ledger 220, the transaction(s) must be deposited to the pool 210, where information present in the pool can be modified, moreover, information can be added to the pool and even deleted therefrom. The pool can be implemented on the level of client software. In order to notify of transactions uploaded into the pool, e.g., a public electronic bulletin board, such as the BlockCipher website etc., can be used.

The ledger 220, where all records are linked into a chain by the blockchain technology, stores records generated based on data from transactions retrieved from the pool 210. As said above, information can be added to the ledger 220 or read therefrom; however, no possibility for modifying information in the ledger 220 or deleting information therefrom is provided. Again, as noted above, all transactions included in various records of the ledger 220 are linked into logical transaction chains, and a root of each transaction chain is its zeroth transaction ($Trx_0$).

Known approaches employed to realize similar public distributed ledgers in known blockchain-based technical solutions can be used for practical implementation of the ledger 220. Bitcoin and Ethereum networks are well-known examples of operating ledgers.

The verifier computer(s) 240 is, in general, responsible for reading transactions from the pool 210 and placing data from transactions into the ledger 220. The number of the verifier computing devices 240 is determined primarily by specific design aspects of the framework 200, in particular, by the scale thereof.

Figure 2:
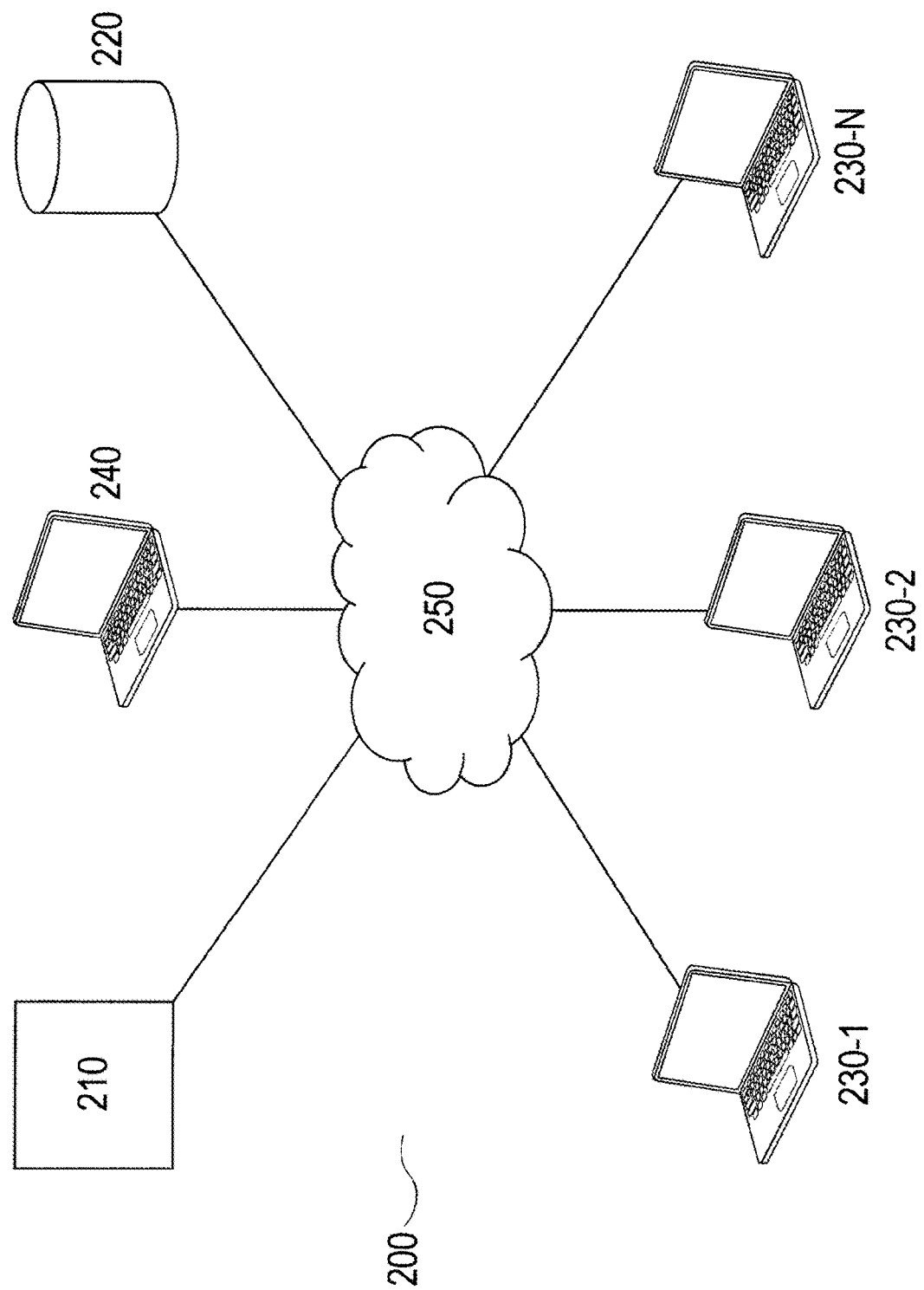
FIG. 2—a diagram of a distributed computer framework according to an exemplary embodiment of the present invention.

All the above-listed components of the distributed computer framework 200 are configured to communicate with each other and other devices/networks using commonly known network and communication technologies, wired and/or wireless (jointly denoted by reference numeral 250 in FIG. 2). In particular, the computing devices 230 of participants, who are owners of key material in the considered case, are in communication with the pool 210 and the ledger 220, and also with each other.

3. Handling Transactions

Exemplary embodiments of generating a transaction chain according to the present invention are described in detail below with reference to FIGS. 3-14.

3.1. Data Structure

Each transaction is the aggregate of six data fields, wherein, as follows from the aforesaid, data contained in the zeroth transaction being the root of the transaction chain is substantially different from data of each subsequent (non-zeroth) transaction in the transaction chain. Therefore, data structures of the non-zeroth and zeroth transactions are described separately below with reference to FIGS. 3 and 4, respectively. The processing performed according to the present invention with respect to the zeroth transaction and non-zeroth transactions is also different; therefore, operations performed with respect to the zeroth transaction and non-zeroth transactions are described separately below with reference to FIGS. 5, 6, respectively.

Figure 3:
FIG. 3—an illustrative structure of a non-zeroth transaction according to the present invention.

Let's first consider, with reference to FIG. 3, the fields of the i-th, i>0, transaction $Trx_i$ from left to right.

The first field 301 of $Trx_i$ is intended for a link value ($L_i$), and its second field 302 is intended for a check value ($C_i$). According to the present invention, the link value is used for linking $Trx_i$ to transactions which precede $Trx_i$ in the transaction chain, and the check value is, in general, used to verify that $Trx_i$ belongs to the transaction chain, i.e. to confirm/deny its linkability. The technique for generating the link value and the check value is described in detail in Subsection 3.4.

The third field 303 of $Trx_i$ is intended for key material ($K_i$), and its fourth field 304 is intended for credentials ($A_i$) of an owner of the key material who desires to register the key material in the ledger. According to the embodiment of the invention, the third field of $Trx_i$ is intended for information on an i-th ordinary public key paired with an i-th ordinary private key which both belong to the owner, where the owner credentials placed into the fourth field 304 are preferably a set of owner attributes. Such attributes can be, e.g., full name, year of birth, address, postal code, taxpayer ID number, etc.

The fifth field 305 of $Trx_i$ is intended for placing therein a specialized public key $P_{trx}$ paired with a specialized private key $S_{trx}$ which is used to generate a digital signature for $Trx_i$. Such specialized pair of keys is referred to herein as the service key pair. The service public key is intended for verification of the digital signature. It should be emphasized that the service key pair is the same for the entire transaction chain and differs from any of ordinary key pairs. The discussion of additional details regarding the service key pair is given in Subsection 3.2. The sixth field 306 is intended for placing therein the digital signature for $Trx_i$. In fact, said digital signature signs the data of the first five fields of $Trx_i$. However, a method of generating a digital signature for a transaction may vary depending on a scenario (see Subsection 3.5.2).

Figure 4:
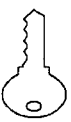
FIG. 4—an illustrative structure of a zeroth transaction according to the present invention.

The fields of the zeroth transaction are considered below from left to right, with reference to FIG. 4.

The first field 401 of $Trx_0$ is empty, e.g. contains a null reference, since $Trx_0$ is not linked to preceding transactions due to absence thereof. The second field 402 is intended for a check value ($C_0$). The third field 403 of $Trx_0$ is intended for an e-wallet address ($K_0$) (see above), and the fourth field 404 is intended for wallet owner credentials ($A_0$) which can be represented by a set of attributes similar to that of the key material owner.

The fifth field 405 of $Trx_0$ is intended for a wallet public key paired with a wallet private key based on which a digital signature of the zeroth transaction is generated. The wallet public key is intended for verification of the digital signature of the zeroth transaction. The sixth field 406 of $Trx_0$ is intended for placing therein the digital signature of the zeroth transaction. This digital signature signs the data from the first five fields of $Trx_0$.

It should be noted that bitlength of the sixth field of both the zeroth and non-zeroth transactions depends on the applied digital signature algorithm and, in general, is not fixed. Bitlength of the other transaction fields will be discussed below. It should be noted that binary numeral system is used throughout the present application.

3.2. Service Keys

In general, the ordinary keys are not suitable for generating digital signatures for transactions, and arguments in support of this fact are given below.

It should be noted that no limitations are imposed on the ordinary key pair. For instance, these keys can be intended only for encryption/decryption by means of a certain algorithm. Furthermore, the ordinary keys may not ensure appropriate cryptographic strength, e.g., because they are designed for usage in "lightweight" cryptography schemes, where a given decrease in cryptographic strength enables to use the cryptographic transformation on devices with a limited computational resource, little memory size, and low power consumption. On the other hand, if generating/verifying a signature is possible, but the ordinary keys provide cryptographic strength of 112 bits and higher, then the overhead associated with storage of the signature can grow significantly. For example, in the case of ECDSA with guaranteed cryptographic strength of 256 bits, it is required to reserve 1024 bits for storing the signature, as compared to 320 bits for ECDSA with cryptographic strength of 80 bits. The overhead for DSA and RSA is significantly higher.

The service key pair $\{S_{trx}, P_{trx}\}$ for a consolidated digital signature (CDS) based on ECDSA (see Subsection 3.5.2.4) with the guaranteed cryptographic strength of 80 bits, which is sufficient for most applications, enables to remove said limitations.

As mentioned above, the service key pair is used for generating/verifying digital signatures for transactions. Existence of plural different chains which belong to the same owner is admissible. Each chain has its own pair $\{S_{trx}, P_{trx}\}$, and the number of such pairs is equal to the number of transaction chains. The public key $P_{trx}$ is included in the fifth field of each transaction from a transaction chain and then stored in the ledger. Let the owner have N different chains. If the ECDSA-based CDS with guaranteed cryptographic strength of 80 bits is used (see Subsection 3.5.2.4), N×160 bits of long-term memory will be required to store the plurality of $S_{trx}$. As a result, the increase in the number of chains leads to expansion of the long-term memory to store service private keys.

The following technique is used to reduce the memory size. Let a secret seed is $r_s \in_R \mathbb{F}_2^{160}$ is given. For an i-th chain, $S_{trx}$ is computed based on iterative hashing as $$S_{trx} = H_{i-1}(H_{i-2}(\ldots(H_0(r_s))\ldots)),$$

where $H_j(\bullet)$ is the cryptographic hash function. This means that $S_{trx}$ can always be computed, and it is only required to store $r_s$ in the long-term memory to this end. $P_{trx}$ is computed based on $S_{trx}$ as described in Subsection 3.5.2.4.

Figure 5:
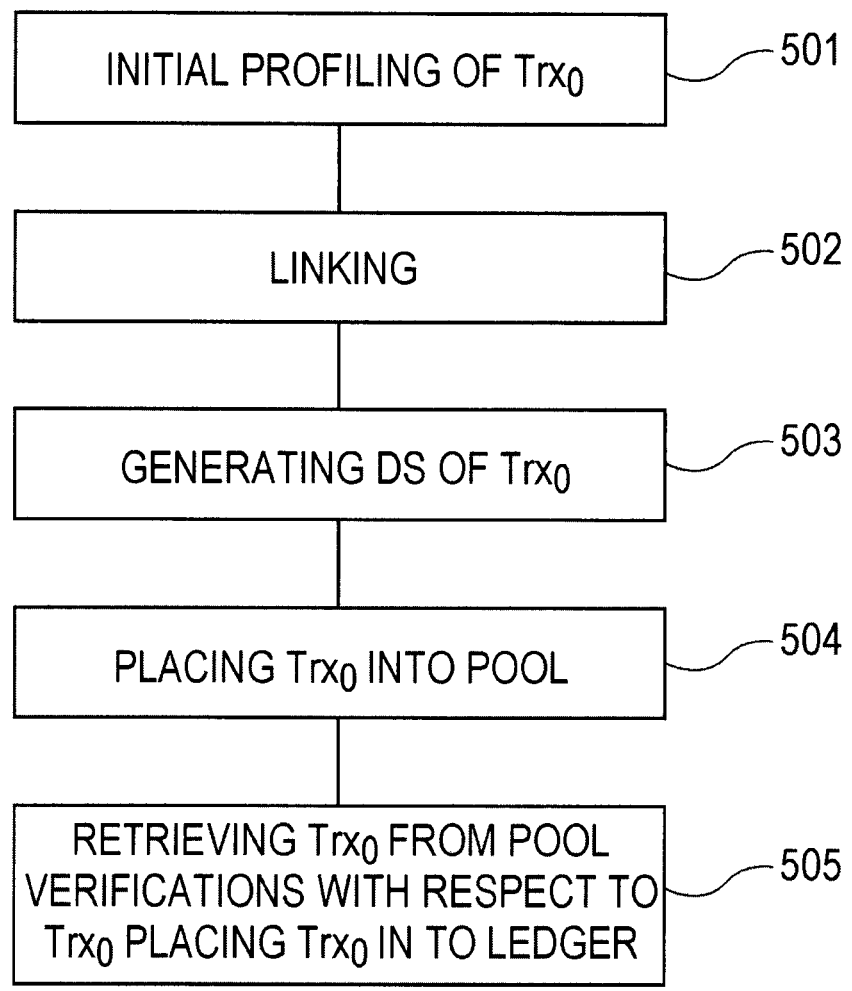
FIG. 5—a flowchart of processing the zeroth transaction according to the present invention.
Figure 6:
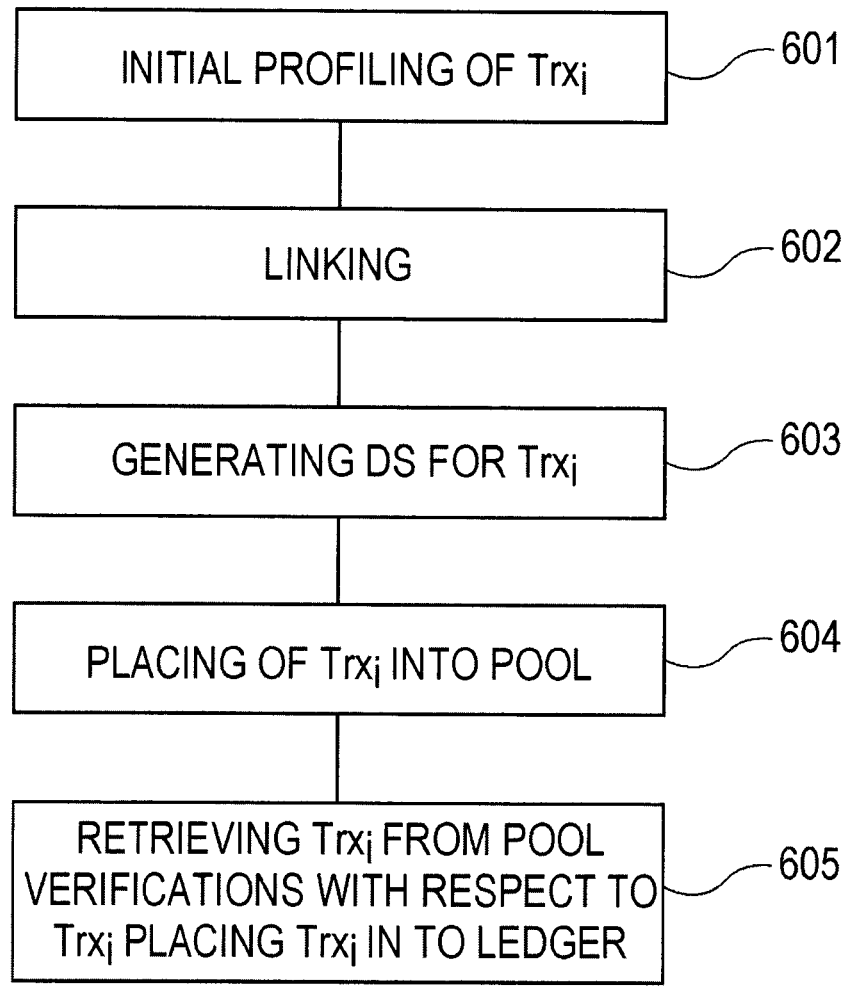
FIG. 6—a flowchart of processing the non-zeroth transaction according to the present invention.

Operations performed when processing the zeroth transaction and non-zeroth transactions are described below with reference to FIGS. 5, 6, respectively.

3.3. Initial Profiling of Transactions

In step 501, initial profiling of the zeroth transaction $Trx_0$ is performed, and in step 601, initial profiling of the i-th, i>0, transaction $Trx_i$ is performed. As discussed above, in accordance with the proposed DPKI concept, said profiling is to be performed in one or more computing devices 230 of key material owners.

More specifically, in step 601, a value of the hash function of the i-th ordinary public key is computed, and the computed value is placed into the third field of $Trx_i$, whereas the credentials of the owner of the i-th ordinary public/private key pair are placed into the fourth field of $Trx_i$. The hash function used in said computation is preferably a combined hash function implemented as the combination of cryptographic hash functions $SHA_{256}$ and $RIPEMD_{160}$, which can be symbolically represented as $$y = RIPEMD_{160}(SHA_{256}(x)).$$

Due to this fact, the third field of $Trx_i$ has fixed bitlength equal to 160 bits. It should be noted here that said combined hash function may differ from the hash function used to compute the service public key (see Subsection 3.2).

The method of generating the third field is governed by the following considerations. It is underlain by the assumption that ordinary public keys correspond to different cryptographic transformations. This means that their bitlength varies widely from 160 bits for ECDSA and other representatives of the family of digital signature algorithms based on a group of elliptic curve points to 1024 bits for DSA and several Kbits for RSA. Since data is stored in the ledger which grows in size as new records are added, the usage of the combined hash function to generate the third field data enables to save both long-term and short-term memory allocated for storing the ledger.

The data of the fourth field of $Trx_i$ depends on the set of owner attributes. The fourth field can therefore have variable bitlength.

It should be noted that the filling of the third field of $Trx_0$ performed in step 501 is carried out in exactly the same manner as in step 601, using the same combined hash function, with the only difference that in step 501 said hash function is applied to the wallet public key. Thus, bitlength of the fourth field of $Trx_0$ is fixed and equal to 160 bits.

In step 501, the wallet owner credentials are included in the fourth field of $Trx_0$. Similarly, the bitlength of the fourth field of $Trx_0$ can be variable. In step 501, the wallet public key is included in the fifth field of $Trx_0$.

In step 601, the service public key pre-computed for the transaction chain being created (see Subsection 3.2) is placed into the fifth field of $Trx_i$.

It should be noticed that registration of an individual ordinary key results in storing the service public key $P_{trx}$ in the ledger. If there are k transactions in the chain, then k copies of $P_{trx}$ are stored in the ledger. At first glance, such an approach seems redundant, however, on the other hand, it provides a simple and effective tool for authentication of $P_{trx}$. Indeed, the more copies of $P_{trx}$ are stored in the ledger, the less likelihood of tampering a digital signature for a transaction is (see Subsection 4.2).

It should be noted that steps 501 and 601 can be performed in different computing devices 230. For example, step 601 is preferably performed in a computing device of the owner of the i-th ordinary key pair being registered (let it be the computing device 230-1). If the wallet public key does not belong to said owner, then step 501 is performed in a computing device of the wallet owner (let it be the computing device 230-N), which is different from the computing device 230-1. In addition, the service public key for the transaction chain being generated may be pre-computed in the computing device 230-1, but, due to specific organization of participants of the framework 200, may also be computed in another of the computing devices 230 and provided to the computing device 230-1 in a known way. Finally, the wallet public key and the ordinary public key(s) can be, in a known way, stored in a data storage(s), whether external or internal to the respective owner computing device 230, and retrieved therefrom to perform initial profiling in said computing device, as described above. It should also be noted that direct implementation of placement of data into respective fields of transactions in initial profiling can be performed by filling electronic forms based on known GUI technologies.

3.4. Linking Transactions

As outlined above, linking of transactions according to the present invention is based on the procedure of iterative hashing according to subsection 1.3, and application of said procedure is described below.

In step 502, the check value for the zeroth transaction $Trx_0$ is computed, and in step 602, the link value and the check value for the i-th, i>0, transaction $Trx_i$ are computed. Steps 502 and 602 are preferably performed in the same computing devices 230 as steps 501 and 601, respectively.

Initially, in step 502, a concatenated value $Conc_0$ is computed as a value of the combined cryptographic hash function of a concatenation of data from the third, fourth, and fifth fields of $Trx_0$, said data being reliably known by this time.

Thereafter, iterative hashing is directly performed. In a zeroth iteration, the combined hash function is applied to a concatenation of the secret seed and $Conc_0$, thereby obtaining a result $RES^0(0)$ of the zeroth iteration. In a first iteration, the combined hash function is applied to a concatenation of $RES^0(0)$ and $Conc_0$, thereby obtaining a result $RES^0(1)$ of the first iteration; in a second iteration, the combined hash function is applied to a concatenation of $RES^0(1)$ and $Conc_0$, thereby obtaining a result $RES^0(2)$ of the second iteration, and so on. Generally speaking, in the course of iterative hashing, in each k-th, $0<k\leq n$, iteration, the combined hash function is applied to a concatenation of $RES^0(k-1)$ and $Conc_0$, thereby obtaining a result $RES^0(k)$ of the k-th iteration. Here n is the maximum number of iterations, iterative hashing completes upon attaining it. The value of n is predefined for the secret seed used in iterative hashing, and it is described in more detail in Subsection 3.7.

Then, in step 502, a final value $RES^0(n)$ is placed into the second field of $Trx_0$ as its check value. $RES^0(n-1)$ can be optionally stored in a certain long-term storage accessible to the computing device 230 where step 502 is performed (e.g., in a hard disk drive which is either internal or external with respect to this computing device, in a specialized data storage system (e.g., in a database) included by the framework 200, in the cloud, etc.)

Figure 7:
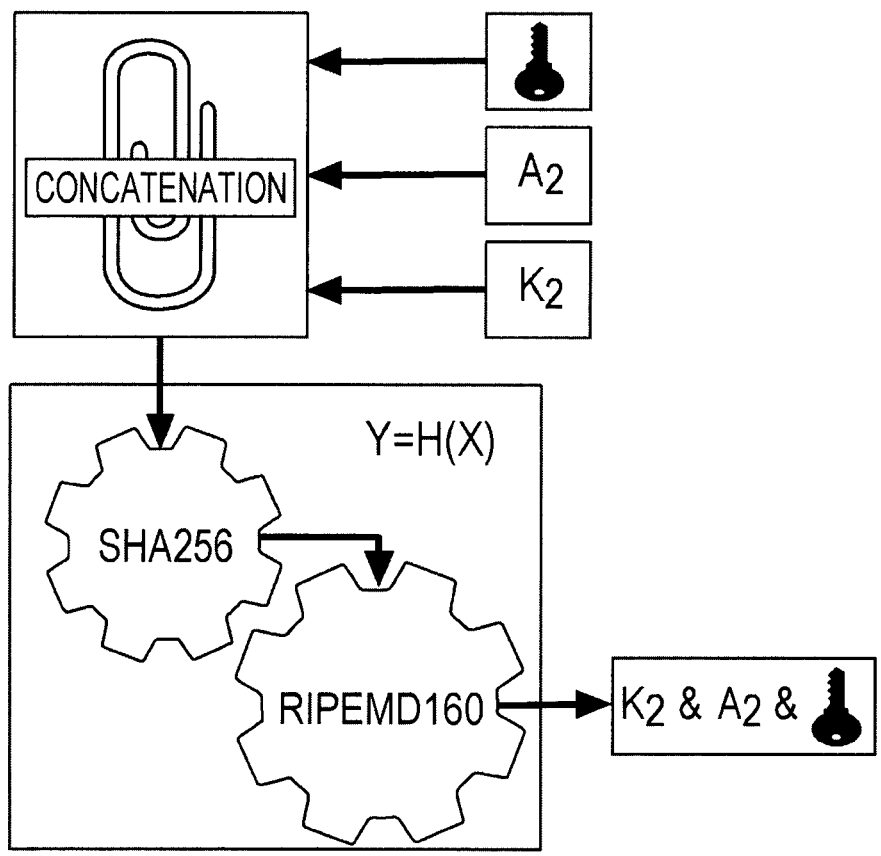
FIG. 7—an illustration of combined hashing of data of the third, fourth, and fifth fields of $Trx_2$ according to an embodiment of the present invention.

Execution of step 602 for the i-th, i>0, transaction $Trx_i$ starts with computing a concatenated value $Conc_i$ as a value of the combined cryptographic hash function of a concatenation of data from the third, fourth and fifth fields of $Trx_i$, said data being reliably known by this time. Said computation is illustrated in FIG. 7 for $Trx_2$.

Then, iterative hashing for $Trx_i$ is performed. In a zeroth iteration, the combined hash function is applied to a concatenation of the secret seed and $Conc_i$, thereby obtaining a result $RES^i(0)$ of the zeroth iteration. Then, in each successively executed k-th iteration, $0<k\le n-i$, where n, as mentioned above, is the predefined maximum number of iterations, the combined hash function is applied to a concatenation of $RES^i(k-1)$, which is a hashing result from the previous (i.e. (k-1)-th) iteration, and $Conc_i$, thereby obtaining a result $RES^i(k)$ of the k-th iteration. As one can see, the number of iterations is reduced by one for each new transaction.

Then, in step 602, a final value $RES^i(n-i)$ is placed into the second field of $Trx_i$ as its check value. $RES^i(n-i-1)$ can be optionally stored in a long-term storage accessible to the computing device 230 where step 602 is performed (e.g., in a hard disk drive which is either internal or external with respect to this computing device, in a data storage system (e.g. a database) included by the framework 200, in the cloud, etc.)

If, according to one embodiment, storing of the result of the penultimate iteration in the long-term storage has been used for, at least, the previous ((i-1)-th) transaction, then, in step 602, $RES^{i-1}(n-i)$ is read from the long-term storage, and the read value of $RES^i(n-i)$ is placed into the first field of $Trx_i$ as its link value. For example, for the first transaction, the value of $RES^0(n-1)$ obtained when performing iterative hashing for $Trx_0$ is read from the long-term storage and used as a link value for $Trx_1$.

At the same time, as follows from the aforesaid, such storing of the penultimate iteration result is not mandatory, and an appropriate embodiment of computing the link value for $Trx_i$ is described below. Said embodiment is implemented based on the fact that $Trx_{i-1}$ has already been included in the ledger 220, and therefore, data of its fields can be read from the ledger 220 and it can be trusted. In said embodiment, in order to calculate the link value for $Trx_i$, iterative hashing is performed on data of the fields of $Trx_{i-1}$ in a way which is substantially similar to that described above.

In particular, first of all, an (i-1)-th concatenated value $Conc_{i-1}$ is initially computed as a value of the combined hash function of a concatenation of data from the third, fourth, and fifth fields of the (i-1)-th transaction, where said data is read from the ledger 220.

In a zeroth iteration, the combined hash function is applied to a concatenation of the secret seed and $Conc_{i-1}$, thereby obtaining a result $RES^{i-1}(0)$ of the zeroth iteration. Then, in each successively performed k-th iteration, $0<k\le n-i$, the combined hash function is applied to a concatenation of $RES^{i-1}(k-1)$, which is a hashing result of the previous iteration, and $Conc_{i-1}$, thereby obtaining a result $RES^{i-1}(k)$ of the k-th iteration. In the end, a value $RES^{i-1}(n-i)$ is placed into the first field of $Trx_i$ as its link value.

Figure 8:
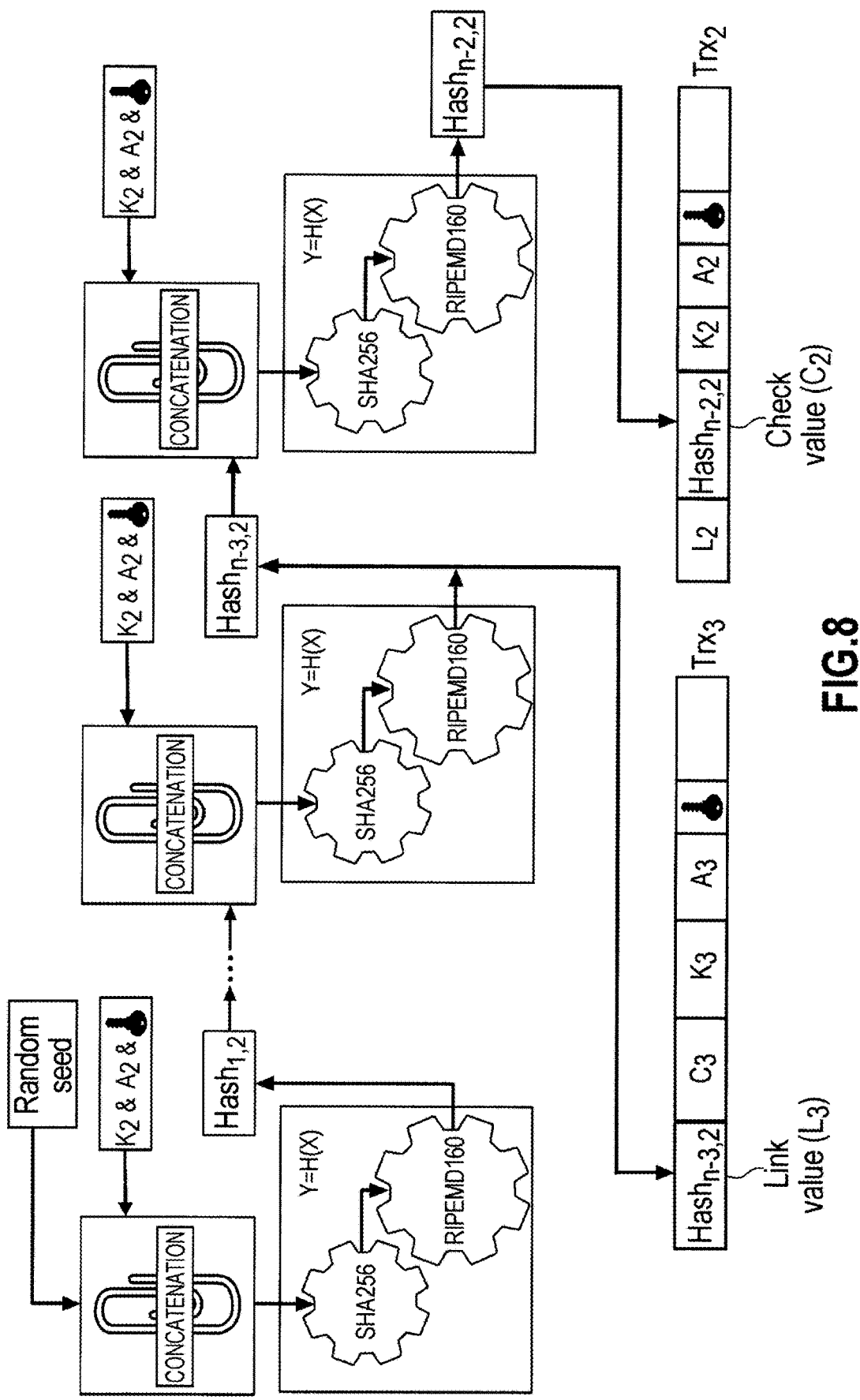
FIG. 8—an illustration of generating a link value for $Trx_3$ and a check value for $Trx_2$ according to an embodiment of the present invention.

FIG. 8, which illustrates the above approach based on iterative hashing exemplified by $Trx_3$ and $Trx_2$, shows that the computation of the link and check values involves the data from the third, fourth, and fifth transaction fields, in particular the value of the combined hash function of the ordinary public key, the owner attributes, and the service public key, respectively.

As described above, in each of steps 502, 602, the data of the third, fourth, and fifth transaction fields is mapped to a 160-bit sequence by using the combined hash function (see FIG. 7). The explanation of what it is necessary for is given below.

The link and check values are computed according to the procedure from Subsection 1.3, and the combined hash function is applied in each step of the iterative transformation. Computational complexity of an arbitrary hash function depends not only on the algorithm, but also on the number of bits at the input which are to be processed. Thus, computational complexity of producing the output of the combined hash function is determined by the number of bits at the input of $SHA_{256}$. Therefore, the pre-processing shown in FIG. 7 allows to reduce computational complexity of the combined hash function, because, for a sequence of m bits at the input of $SHA_{256}$, computational complexity of generating the output of $SHA_{256}$ is estimated as $O(m^2)$ binary operations. Computational complexity of producing the output of $RIPEMD_{160}$ is constant, since 256 bits are supplied to the input of the hash function in each step of the iterative transformation.

A pseudo-random seed (denoted as Random seed in FIG. 8) which is known only to the owner is used as the seed in steps 502, 602. Bitlength of the pseudo-random seed is 160 bits. It should be noted that iterative transformations for each transaction of the same owner use the same pseudo-random seed. As a result, a sequence of 320 bits is applied to the input of the combined hash function in each iteration. It should also be noticed that the seed in steps 502 and 602 may differ from the seed $r_s$ used to compute the service private key (see Subsection 3.2).

So, bitlength of the first and second fields of each transaction, as well as bitlength of its third field, is fixed and equals 160 bits. In accordance with the above description, bitlength of the first and second fields is defined by the construction method, namely, by applying the combined hash function in each step of the iterative transformation.

In should be emphasized at this point that the requirements for cryptographic strength can change, and this may cause the necessity of switching to other hash functions. It should be understood that bitlength of at least some transaction fields may change in switching to other hash functions.

It should be further noticed that, according to the preferred embodiment of the present invention, software responsible for performing, in particular, steps 501-502, 601-602 described above in a respective computing device 230 resides the so-called security perimeter that limits the area of relative invulnerability within which the likelihood of an attacking impact is minimal. The pool and the ledger are outside the security perimeter. Such a security perimeter can be implemented in the computing device 230 with the use of known programming techniques.

3.5. Generating Digital Signature

3.5.1. Generating Digital Signature for Zeroth Transaction

Transaction $Trx_0$ plays a special role both in linking and in charging a commission fee for processing $Trx_j$, $j \geq 0$ (i.e., the commission fee is also charged for processing $Trx_0$). By means of $Trx_0$, the wallet address, the wallet public key, the first check value are included in the ledger and the link value is computed which is used then to confirm linkability of the subsequent transaction. $Trx_0$ is substantially an anchor which holds the entire transaction chain of an individual owner.

Figure 9:
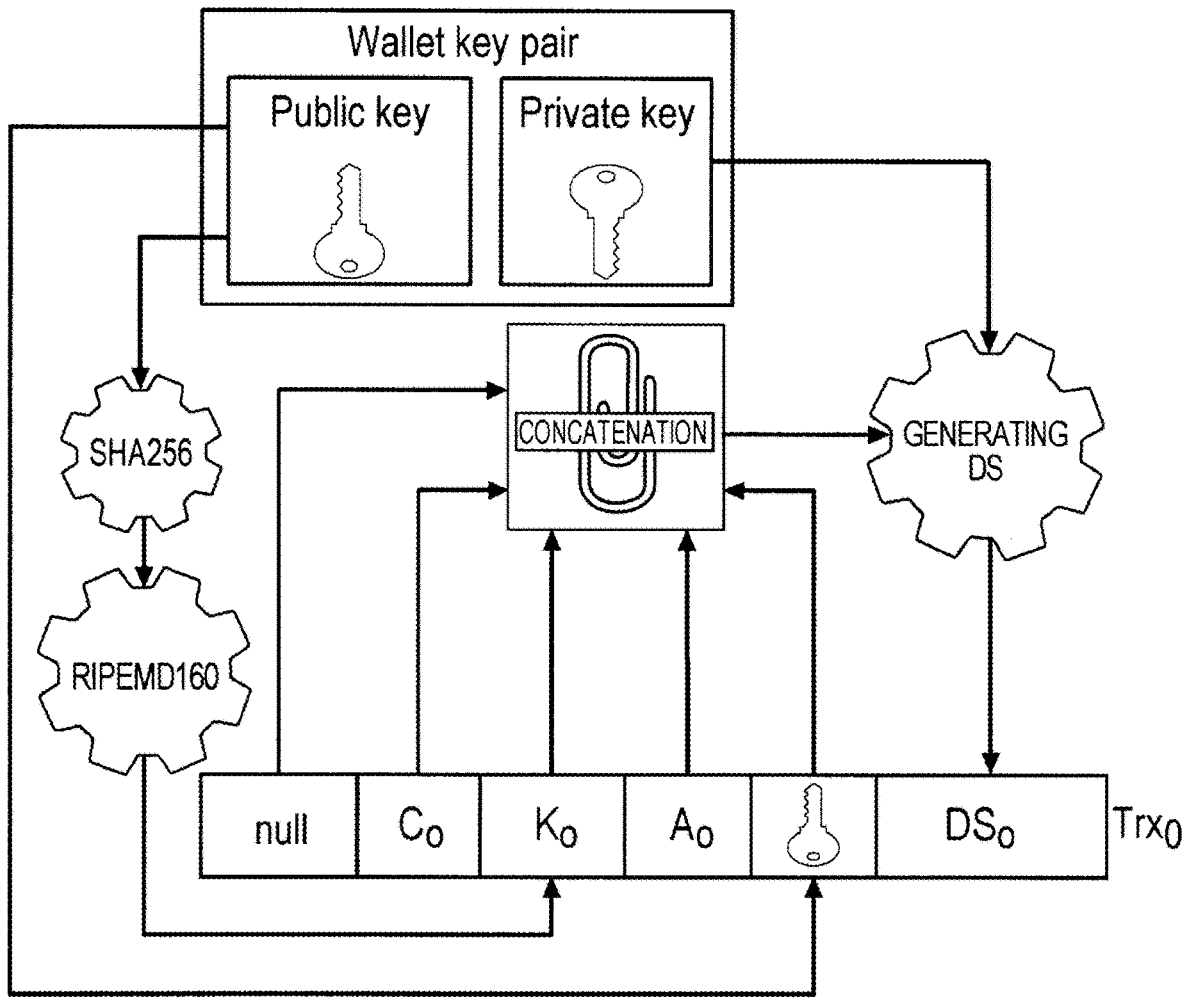
FIG. 9—an illustration of generating a digital signature for the zeroth transaction according to an embodiment of the present invention.

Generating the digital signature of $Trx_0$, as performed in step 503, is illustrated in FIG. 9. Step 503 is preferably performed in the same participant computing device 230 of the framework 200 as steps 501, 502. As seen from FIG. 9, the digital signature of $Trx_0$ is computed by applying a predefined cryptographic transformation to a concatenation of the data of the first, second, third, fourth, and fifth fields of $Trx_0$ with the use of the wallet private key. It is obvious that, by the time of generating the digital signature of $Trx_0$, the data of all its five fields must be known. Furthermore, the wallet private/public key pair must be available, and it is also necessary to choose the cryptographic transformation to be used for generating the digital signature. As mentioned above, known cryptographic transformations, such as DSA, ECDSA, RSA, can be used as said transformation.

The digital signature of $Trx_0$ computed in step 503 is placed into the sixth field of $Trx_0$. All the six fields of $Trx_0$ are thus filled.

3.5.2. Generating Digital Signature of Non-Zeroth Transaction

In step 603, the digital signature for $Trx_i$, $i > 0$ is generated.

3.5.2.1. Individual and Collective Scenarios

The present application provides two scenarios, the individual and collective scenarios, which reflect different approaches to key distribution.

The individual scenario. There is a single signer who is herein a participant responsible for generating a digital signature, and said signer knows both private keys, i.e. the service key and the wallet key, and also the secret seed. The digital signature is generated within the security perimeter in a computing device of the signer.

The collective scenario. There are two individual signers, each knows his/her own private key and does not know the private key of the other one. For example, the one signer knows the service private key and the secret seed, whereas the other signer knows the wallet private key. Two different digital signatures are generated, each within its own security perimeter in a computing device of the respective signer. The one digital signature is generated first, and then data signed by the signature is further signed by the other digital signature. In fact, the data is transferred between the security perimeters, and, during some time interval, the data is in the transit zone and, hence, vulnerable to attacks.

Let us consider these scenarios in view of objectives of a modern corporation.

3.5.2.2. Individual Scenario

In the individual scenario according to the present application it is assumed that the signer independently takes a decision on registering an ordinary public key, and a successful result of said registration is placing the information on this public key into the ledger 220. For example, such an signer may be the head of a division within a corporation or another representative with respective authority. Here the independence means that such a decision is not coordinated with anyone and does not require authorization from a higher level authority. Besides knowing the service private key, the registration also requires access to the wallet private key, as well as to the secret seed which is used to compute the check and link values (see Subsection 3.4).

Let us assume that the signer is the owner of the i-th ordinary private/public key pair, and, in accordance with the aforesaid, he or she possesses the secret seed, the service private key, and the wallet private key. In step 603, the digital signature for $Trx_i$ is computed in the computing device 230 of said owner, in general, by applying a predefined cryptographic transformation to the concatenation of the data from the first, second, third, fourth, and fifth fields of $Trx_i$ with the use of the service private key and the wallet private key. Again, by the time of generating the digital signature for $Trx_i$, the data of all its five fields must be known and reliable.

According to the preferred embodiment of the present invention, keeping in mind that both private keys are known to the owner, then the consolidated digital signature (CDS) algorithm is employed enables to store only one single digital signature (see Subsection 3.5.2.4).

Figure 10:
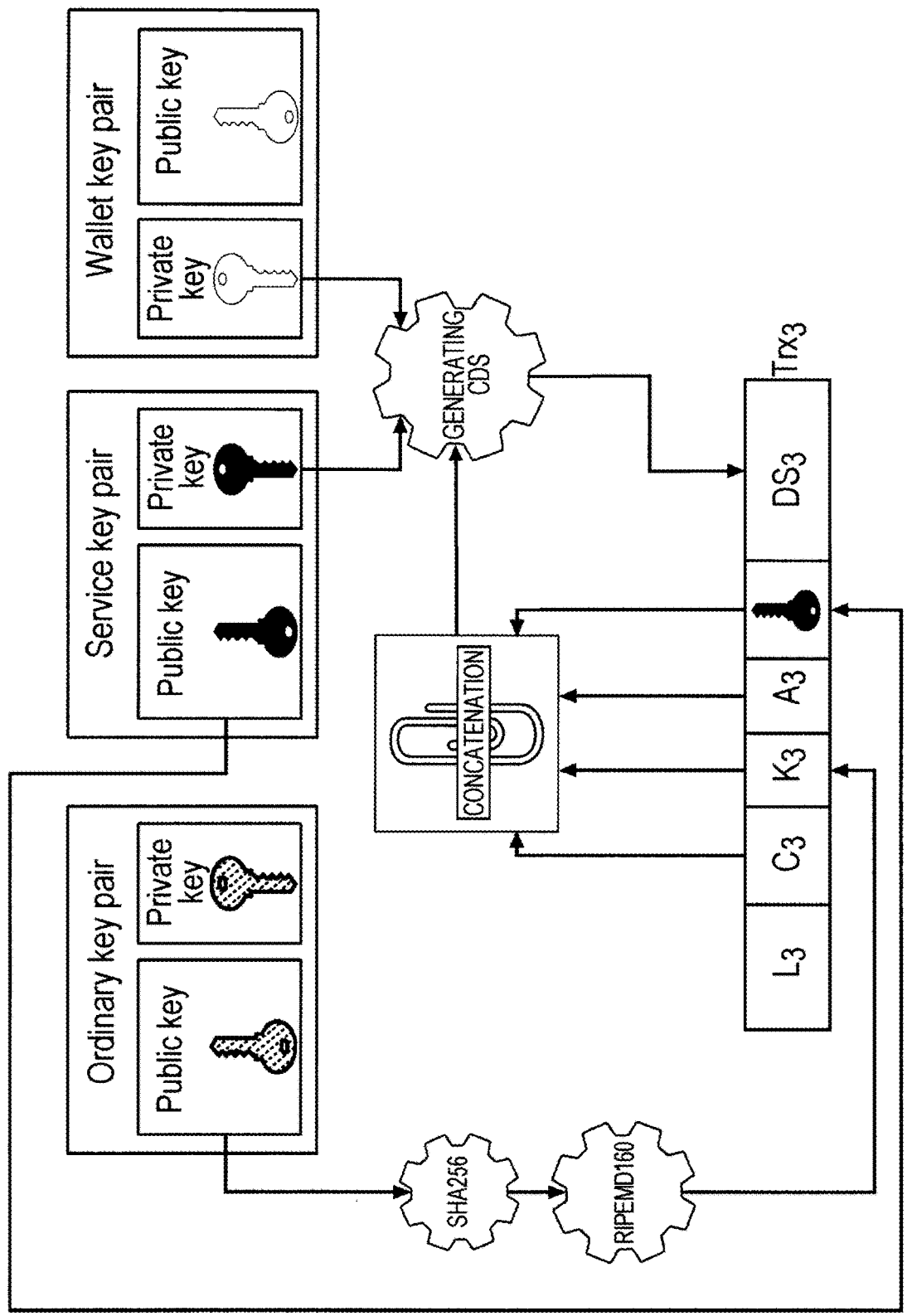
FIG. 10—an illustration of generating a digital signature for the non-zeroth transaction according to an embodiment of the present invention.

Generating the digital signature for the individual scenario is generally exemplified in FIG. 10 by $Trx_3$.

3.5.2.3. Collective Scenario

The owner of the ordinary key pair is not authorized to independently take a decision on registration of the ordinary public key, since he/she has a subordinate position in the corporate hierarchy. The owner has to notify a higher level authority about his/her intentions. The registration is authorized upon a positive decision. Since the requestor is an employee of the corporation, it is assumed that his or her identity has been reliably authenticated.

The requestor submits, to the higher level authority, a request to generate $DS_{wal}$. If a decision is negative, then the higher level authority rejects the request.

The case where the decision is positive is described below. Since the higher level authority, e.g. the head of a division, owns the wallet private key, the procedure consists of the following steps:

Step I which is performed in a computing device of the requestor.

1) The requestor generates $DS_{trx}$ based on the known data of the first, second, third, fourth, and fifth fields of $Trx_i$ (see Subsection 3.5.2.2). $DS_{trx}$ can be generated by means of the CDS algorithm (see Subsection 3.5.2.4.3).

Step II which is performed in a computing device of the higher level authority.

1) The higher level authority initially verifies correctness of the service public key which has been provided to the higher level authority in advance by the requestor for the transaction chain being created, and then verifies validity of $DS_{trx}$ by means of the provided service public key. The collective scenario assumes that subordinates provide a higher level authority with such service public keys for each transaction chain.

2) If validity of $DS_{trx}$ is acknowledged, the higher level authority generates $DS_{wal}$ based on the provided data of the first, second, third, fourth, and fifth fields of $Trx_i$ and $DS_{trx}$ (see Subsection 3.5.2.2). Otherwise, the higher level authority refuses to generate $DS_{wal}$.

As noted above, the higher level authority does not know the service private key used to generate $DS_{trx}$.

Both $DS_{trx}$ and $DS_{wal}$ obtained in the manner described above are placed into the sixth field of $Trx_i$.

3.5.2.4. Consolidated Digital Signature

For the sake of illustration, the CDS algorithm based on the DSA algorithm will be considered first, and then it will be shown how this works for the ECDSA algorithm.

3.5.2.4.1. DSA-Based CDS

It is assumed here that the wallet key pair is generated in accordance with the rules of the DSA algorithm. Then the wallet private key is $x_0 \in_R (0, q-1]$, where q is the prime order of a subgroup of a multiplicative group of the prime field $\mathbb{F}_p$. The paired public key is calculated as $y_0 = g^{x_0} \mod p$, where g is the generating element of the subgroup of the prime order q, and $g^q \mod p = 1$.

The private and public keys for CDS are computed as follows:
1. Select a random integer $x_1$ from the interval (0, q-1].
2. Calculate $y_1 = g^{x_1} \mod p$.

As a result, the private key $x_1$ and the public key $y_1$ are obtained. The domain parameters {p, q, g} are known to everyone.

Next, generation/verification of a signature by the CDS algorithm for the key pairs $P_0 = \{x_0, y_0\}$ and $P_1 = \{x_1, y_1\}$ is considered. According to the above discussion, in the individual scenario a signer knows $P_0$ and $P_1$. Let H(•) denote some cryptographic hash function, and let m be a data set that is to be signed by the CDS.

CDS is computed according to the following algorithm:
1. Calculate h=H(m).
2. Select a random integer k from the interval (0, q-1].
3. Calculate $R = (g^k \mod p) \mod q$. If R=0, then proceed to step 2.
4. Calculate $S = k^{-1}(\hbar + (x_0 + x_1)R) \mod q$. If S=0, then proceed to step 2.
5. Signature: {R, S}.

m' и {R̂, Ŝ} are given. Then verification of CDS is performed as follows:
1. Calculate $\hat{\hbar} = H(m')$.
2. Calculate a consolidated public key $y = y_0 y_1 = g^{(x_0 + x_1)} \mod q$.
3. Calculate $R' = g^{\hat{\hbar}/\hat{S} \mod q} y^{\hat{R}/\hat{S} \mod q}$.

The Boolean expression $\mathfrak{B} = (\hat{\hbar} = \hbar) \wedge (\hat{S} = S) \wedge (\hat{R} = R)$ is introduced. Let equality be associated with the true value, and inequality be associated with the false one. Then $\mathfrak{B}$ is true if each of the three conditions is met, in particular refers to equality. If at least one of the three conditions is not met, in particular refers to inequality, then $\mathfrak{B}$ takes the false value. Let us show that if $\mathfrak{B}$ is true, then R'=R.

$$R' = g^{\hbar/S \mod q} g^{(x_0+x_1)R/S \mod q} = \qquad (1)$$
$$= g^{\frac{\hbar + (x_0+x_1)R}{k^{-1}(\hbar+(x_0+x_1)R)} \mod q} =$$
$$= (g^k \mod p) \mod q.$$

In the general case, it follows from equation (1) that if $\mathfrak{B}$ is false, then R'≠R. There is, however, an exception to the general case, when $(\hat{\hbar} \neq \hbar) \wedge (\hat{S} \neq S) \wedge (\hat{R} \neq R) \rightarrow (R'=R)$. For this it is sufficient to set $\hat{\hbar} = \hbar g^z$, $\hat{R} = Rg^z$, and $\hat{S} = Sg^z$, where $z \in \mathbb{Z}$. Then, $$R' = g^{\hat{\hbar}/\hat{S} \mod q} g^{(x_0+x_1)R/\hat{S} \mod q} = \qquad (2)$$
$$= g^{\frac{\hbar g^z + (x_0+x_1)Rg^z}{k^{-1}(\hbar g^z+(x_0+x_1)Rg^z)} \mod q} =$$
$$= (g^k \mod p) \mod q.$$

In the context of equation (2), the multiplication by $g^z$ does not lead to reduction in cryptographic strength and does not have an adverse affect on qualitative characteristics of CDS.

3.5.2.4.2. ECDSA-Based CDS

The elliptic curve E over the prime field $\mathbb{F}_p$ is denoted by $E(\ell_p)$. Let the group of points $E(\mathbb{F}_p)$ of the order $\#E(\mathbb{F}_p)$ is defined on $E(\mathbb{F}_p)$. Also defined is the point G of such a prime order q that $q | \#E(\mathbb{F}_p)$. This means that G generates a subgroup of the prime order q of the group of points $E(\mathbb{F}_p)$. Each point is defined by its coordinates. For example, the point Q has the coordinates $(x_Q, y_Q)$.

Let us introduce an operation over the point G of the kind $Q = [\ell G$, such that $$Q = \underbrace{G + G + \ldots + G}_{\ell}, Q = [a]G + [b]G = [a+b]G.$$

If the wallet key pair is generated in accordance with the rules of the ECDSA algorithm, then the wallet private and public keys are:

$$x_0 \in_R (0, q-1] \text{ и } Y_0 = [x_0]G.$$

The private and public keys for CDS are computed as follows:
1. Select a random integer $x_1$ from the interval (0, q-1].
2. Calculate $Y_1 = [x_1]G$.

As a result, the private key $x_1$ and the public key $Y_1$ are obtained. The domain parameters {p, q, E/$\mathbb{F}_p$, #E $\mathbb{F}_p$), G} are known to everyone.

$P_0 = \{x_0, Y_0\}$, $P_1 = \{x_1, Y_1\}$ and m are given. A signature according to the CDS algorithm is generated as follows:
1. Calculate $\hbar = H(m)$.
2. Select a random integer k from the interval (0, q-1].
3. Calculate R=[k]G. The point R has the coordinates $(x_R, y_R)$. Then, $R = x_R \mod q$. If R=0, then proceed to step 2.
4. Calculate $S = k^{-1}(\hbar + (x_0 + x_1)R) \mod q$. Если S=0, then proceed to step 2.
5. Signature: {R, S}.

m' и {R̂, Ŝ} are given. Then, the following actions are to be performed to verify the signature according to the CDS algorithm:
1. Calculate $\hat{\hbar} = H(m')$.
2. Calculate the consolidated public key $Q = Y_0 + Y_1$.
3. The point at infinity is denoted by O. The following checks are performed:
3.1. $Q \stackrel{?}{\neq} O$ and coordinates $(x_Q, y_Q)$ are true.
3.2. Q lies on the curve.
3.3. $[q]Q \stackrel{?}{=} O$.
4. Calculate $R' = [\hat{\hbar}/\hat{S} \mod q]G + [\hat{R}/\hat{S} \mod q]Q$. It is shown below that if $\mathfrak{B}$ is true, then R'=R.

$$R' = [\hbar/S \mod q]G + [(x_0+x_1)R/S \mod q]G = \qquad (3)$$
$$= \left[\frac{\hbar + (x_0+x_1)R}{k^{-1}(\hbar+(x_0+x_1)R)} \mod q\right]G = [k]G = R$$

In the general case, it follows from equation (3) that $R' = x_R \mod q = R$, and if $\mathfrak{B}$ is false, then, R'≠R. There is also an exception here similar to that considered in the case of the DSA-based CDS.

3.5.2.4.3. CDS in Collective Scenario

It is assumed here that the private key $x_1 \in_R (0\ q-1]$ and the public key: $Y_1 = [x_1]G$ are available. In the collective scenario $x_1$ is known only to the signer who occupies a subordinate position in the hierarchy. In this case the CDS is generated by the algorithm from Subsection 3.5.2.4.3 with the only difference that $S = k^{-1}(\hbar + x_1 R) \mod q$.

When verifying the signature, the consolidated public key is computed as $Q=Y_1$ and $$R' = [\hbar/S \bmod q]G + [x_1R/S \bmod q]G =$$
$$= \left[\frac{\hbar + x_1R}{k^{-1}(\hbar + x_1)R} \bmod q\right]G = [k]G = R.$$

3.5.2.4.4. CDS As Generalization of ECDSA

It is assumed here that there are n different ordinary key pairs $\{\mathcal{P}_i, S_i\}$, $i=\overline{1,n}$. Each $\mathcal{P}_i$ has its own key pair of the CDS algorithm $P_i=\{x_i, Y_i\}$ corresponding thereto, where $Y_i=[x_i]G$. Furthermore, there is the wallet key pair $P_0=\{x_0, Y_0\}$. Then, $$\Gamma = \sum_{i=0}^{n} x_i \qquad (4)$$

and $S=k^{-1}(\hbar+\Gamma R)$ mod q. The consolidated public key $$Q = \sum_{i=0}^{n} Y_i[\Gamma \bmod q]G \qquad (5)$$

and $$R' = [\hbar/S \bmod q]G + [\Gamma R/S \bmod q]G =$$
$$= \left[\frac{\hbar + \Gamma R}{k^{-1}(\hbar + \Gamma R)} \bmod q\right]G = [k]G = R.$$

Let the functions of generating and verifying in accordance with the CDS algorithm are defined as Sign($\hbar$, $\Gamma$) and Verify($\hbar$, Q, R, S), respectively. Sign(,) returns the signature $\{R, S\}$, while Verify(, , ) returns the Boolean value $\Re$. If no changes are identified in the input data, then the value of $\Re$ is True, and False otherwise.

Parameterization by $\Gamma$ enables to flexibly adjust Sign(,) depending on the number of available key pairs. Hence, the ECDSA algorithm is a special case of the CDS algorithm at $\Gamma=x$ and $Q=Y=[x]G$.

3.5.2.4.5. Computational Efficiency and Memory

Let $DS_{wal}$ be generated according to the ECDSA algorithm, and $DS_{trx}$ be generated according to the CDS algorithm based on the ECDSA algorithm, as described in Subsection 3.5.2.4.3. Both in the collective and individual scenarios, it is required to store the public key $Y_2=[x_2]G$ in a special field of each transaction. It is assumed here that the ECDSA algorithm with the guaranteed cryptographic strength of 80 bits is sufficient to solve practical problems. Then it is required to reserve 160 bits for storing $Y_2$.

320 bits are required to store every signature: 160 bits for R and the same number of bits for S. The comparison shows that 320 bits are stored in the individual scenario against 640 bits in the collective scenario, thereby providing the gain of 320 bits per transaction.

Then the CDS algorithm in the individual scenario is considered. Since only one signature is generated/verified, the computational efficiency of the individual scenario is determined by the number of key pairs involved in the transformation.

The following additional actions are performed for $P_0$ и $P_1$:

1. When generating the signature, the multiplier $(x_0+x_1)$ occurs, H one summation of numbers from $\mathbb{Z}_q$ is required to calculate it.
2. When verifying the signature, the consolidated public key $Q=Y_0+Y_1$ is calculated. To this end, it is necessary to perform y-fold summation of the point G, where $\gamma=(x_0+x_1)$ mod q. If it is required, in the ECDSA algorithm without account of multiplicative inversion $k^{-1}$ and mod q reduction in computing S, to perform two multiplications and one summation of numbers from $\mathbb{Z}_q$, then, for example, in the case of four pairs there is a need for three additional summations. Thus, computational complexity of generating a signature by the CDS algorithm grows linearly with n.

Next, computational complexity of generating a signature by the ECDSA-based CDS algorithm is compared for the individual and collective scenarios. Let us assume that in the case of the collective scenario the signature is generated in a way described in Subsection 3.5.2.4.3. In the collective scenario the aggregate number of multiplications, summations, multiplicative inversions, and modulo reductions for n pairs is estimated as $n(2_{MUL}+1_{ADD}+1_{INV}+1_{MOD})$ against $n(2_{MUL}+1_{ADD})+1_{INV}+1_{MOD}$ in the individual scenario. Therefore, the individual scenario is n times more efficient in terms of the number of multiplicative inversions and modulo reductions. If there are n ordinary pairs and the wallet pair, then it is required to further generate a signature using the wallet private key, and, when verifying the signature, it is necessary to perform F-fold summation of the point G, where the parameter F is defined in (4).

It should be noted that the signature is generated once, but it is verified whenever the need arises. Every new signature is unique due to $k \in_R (0, q-1]$, and the consolidated public key $Q=[\Gamma \bmod q]G$. is required to verify it. If the parameter $\Gamma$ is fixed, then the key Q will be fixed as well. In the case of verifying the signature at the fixed $\Gamma$, it would be reasonable to calculate the key Q and store it in the long-term memory, and read it thereafter from said long-term memory each time when equation (5) is verified.

3.6. Placing Transactions into Pool

In step 504, $Trx_0$, having all its fields filled as a result of performing the operations according to the preceding steps 501-503, is placed into the public pool 210 using known technologies of network information exchange. Similarly, in step 604, $Trx_i$, having all its fields filled as a result of performing the operations according to the preceding steps 601-603, is placed into the pool 210. Acceding to the logic of performing steps 501-503, 601-603, transactions are supplied to the pool 210 sequentially, i.e., figuratively speaking, $Trx_3$ can not be placed into the pool prior to $Trx_2$. As noted earlier, a public electronic bulletin board, similar to the BlockCipher website, can be used to notify about each transaction uploaded to the pool.

Figure 11:
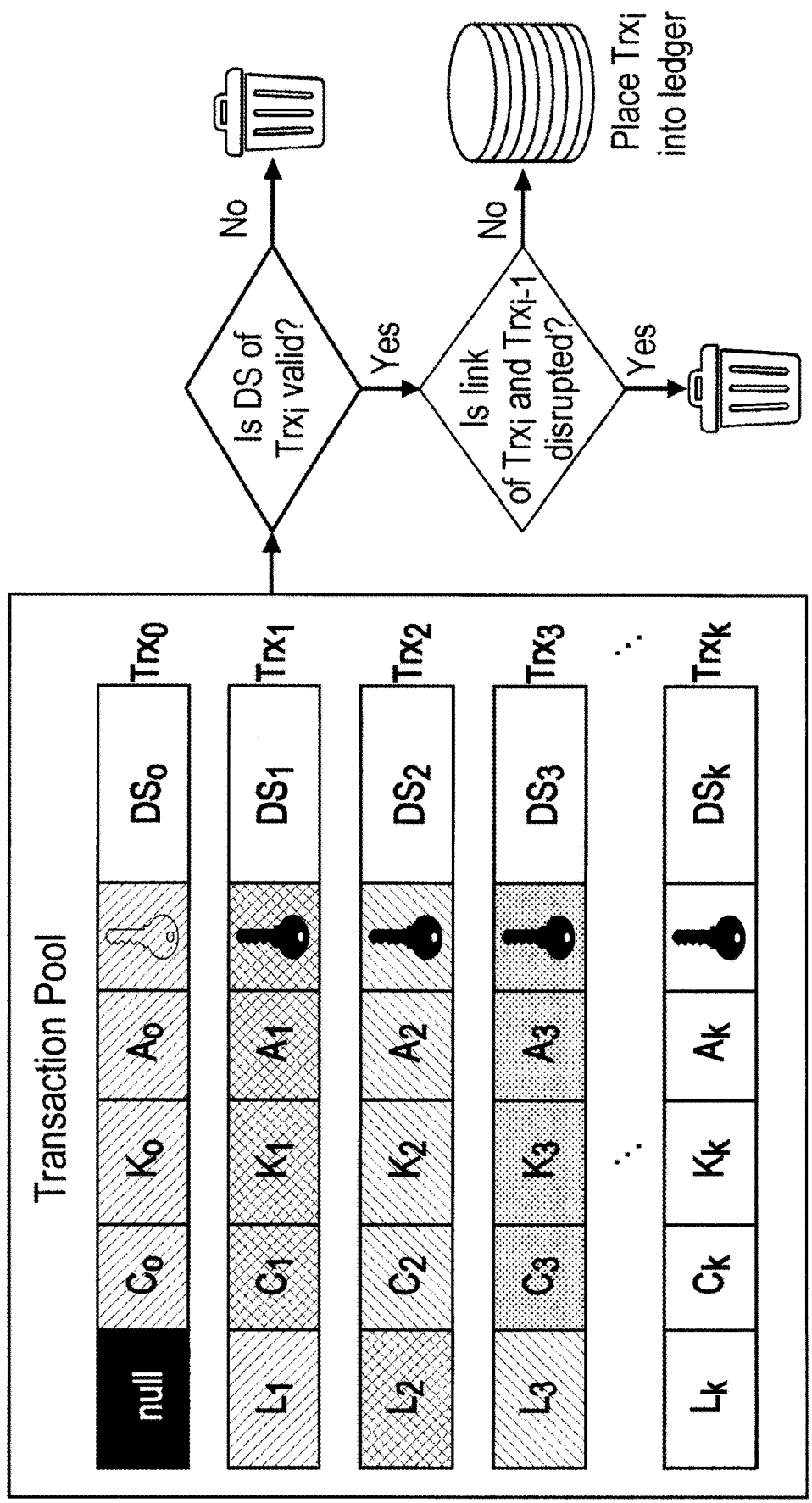
FIG. 11—an illustration of transactions in the public pool and processing the transactions from the pool according to an embodiment of the present invention.

FIG. 11 illustrates transactions of the transaction chain being generated, said transactions being in the pool 210. As follows from FIG. 11, the pool 210 includes k+1 transactions—from $Trx_0$ to $Trx_k$. The first field of each transaction comprises the link value. The first field of $Trx_0$ (marked by black color) comprises the null reference, because $Trx_0$ is not linked to preceding transactions due to absence thereof. The second field of each transaction comprises the check value. The algorithm of computing the link value and the check value is described in Subsection 3.4. It should be noted that $Trx_i$ is linked to $Trx_0$. Such link is established by means of the fields marked by diagonal ruling. In turn, $Trx_2$ is linked to $Trx_i$ (the fields marked by crosshatch), etc.

It should also be noticed in view of the individual and collective scenarios considered in Subsection 3.5 that, when generating the transaction chain according to the present invention, transition from one scenario to the other can occur at any time. This means that if the i-th transaction, e.g. has been generated according to the collective scenario (two different digital signatures), then the (i+1)-th transaction can be nevertheless generated by the individual scenario (one consolidated signature), or vice versa.

3.7. Registration of Transaction Data in Ledger

In step 505, which is performed in the verifier computing device 240, $Trx_0$ is retrieved from the pool 210, and validity of the digital signature of $Trx_0$ is then verified. If validity of the digital signature of $Trx_0$ is acknowledged, the data of $Trx_0$ is placed into the ledger 220.

In step 605, which is also performed in the verifier computing device 240, each i-th, i>0, transaction is retrieved in succession from the pool, followed by verification of the transaction for taking a decision on placing the data of $Trx_i$ into the ledger 220. Said verification generally comprises verification of validity of the digital signature for $Trx_i$ and, if validity of the digital signature is acknowledged, verification of linkability for $Trx_i$. These two verifications are described below in more detail. If validity of the digital signature for $Trx_i$ and linkability thereof are confirmed, the data of $Trx_i$ is placed into the ledger 220.

FIG. 11 generally shows the logic of processing transactions from the pool 210.

It should be noted that the order should be maintained when processing transactions from the pool 210. This means that $Trx_j$ can not be processed before $Trx_{j-1}$, $0<j\leq k$ is processed. It is natural that $Trx_0$ must be processed and verified first.

3.7.1. Preliminary Verifications

It is obvious from the above discussion that the verifier has a burden of responsibility for deciding whether to place data of each particular transaction into the ledger 220, in view at least of the fact that data of transactions residing in the pool 210 and subsequently retrieved by the verifier therefrom can be compromised in the pool 210 in various ways. For this reason, preliminary verifications are preferred in order to minimize inclusion of fraudulent data in the ledger.

According to the preferred embodiment of the present invention, the following verification should be performed before verifying validity of the digital signature of $Trx_0$ retrieved from the pool. The wallet public key from the fifth field of $Trx_0$ is compared with a true wallet public key within the security perimeter in the verifier computing device 240. The true wallet public key is preferably retrieved in a known way from a data storage in the framework 200 which is accessible to the verifier computing device 240. If identity of the wallet public key from $Trx_0$ to the true wallet public key is acknowledged in said comparison, then further verification is preferably performed where the value of the third field of $Trx_0$ is compared with a value of the first hash function of any of the wallet public key from the fifth field of $Trx_0$ and the true wallet public key. If identity of the compared values is acknowledged, then transition is made to verifying validity of the digital signature of $Trx_0$ according to step 505.

According to the preferred embodiment under consideration, the following verification is performed before validity of the digital signature for $Trx_1$ retrieved from the pool is verified. The service public key from the fifth field of $Trx_i$ is compared with a true service public key within the security perimeter in the verifier computing device 240. The true service public key can be preliminarily obtained from the participant computing device 230 where it was computed, or from a certain data storage in which said true service public key has been preliminarily stored and which is accessible to the verifier computing device 240 in the framework 200. If identity of the service public key from $Trx_i$ to the true service public key is acknowledged in said comparison, then a transition is made to verifying validity of the digital signature for $Trx_1$ according to step 605.

Finally, according to the preferred embodiment under consideration, the following verification is performed before validity of the digital signature for each i-th, i>1, transaction retrieved from the pool is verified. The service public key from the fifth field of $Trx_i$ is compared with the service public key read from the ledger 220 which has been copied from the fifth field of the m-th, $1\leq m\leq i-1$, transaction upon successful processing thereof. It should be noted that said transaction belongs to the same transaction chain as $Trx_i$. Since the service public key is read from the ledger, then it can be considered to be persistent. If identity of the service public key from $Trx_i$ to the service public key read from the ledger is acknowledged in said comparison, then a transition is made to verifying validity of the digital signature for $Trx_i$ according to step 605.

The digital signature verification can be also preceded by authenticating credentials from the fourth transaction field in the verifier computing device 240.

3.7.2. Verifying Digital Signature for Zeroth Transaction

Figure 12:
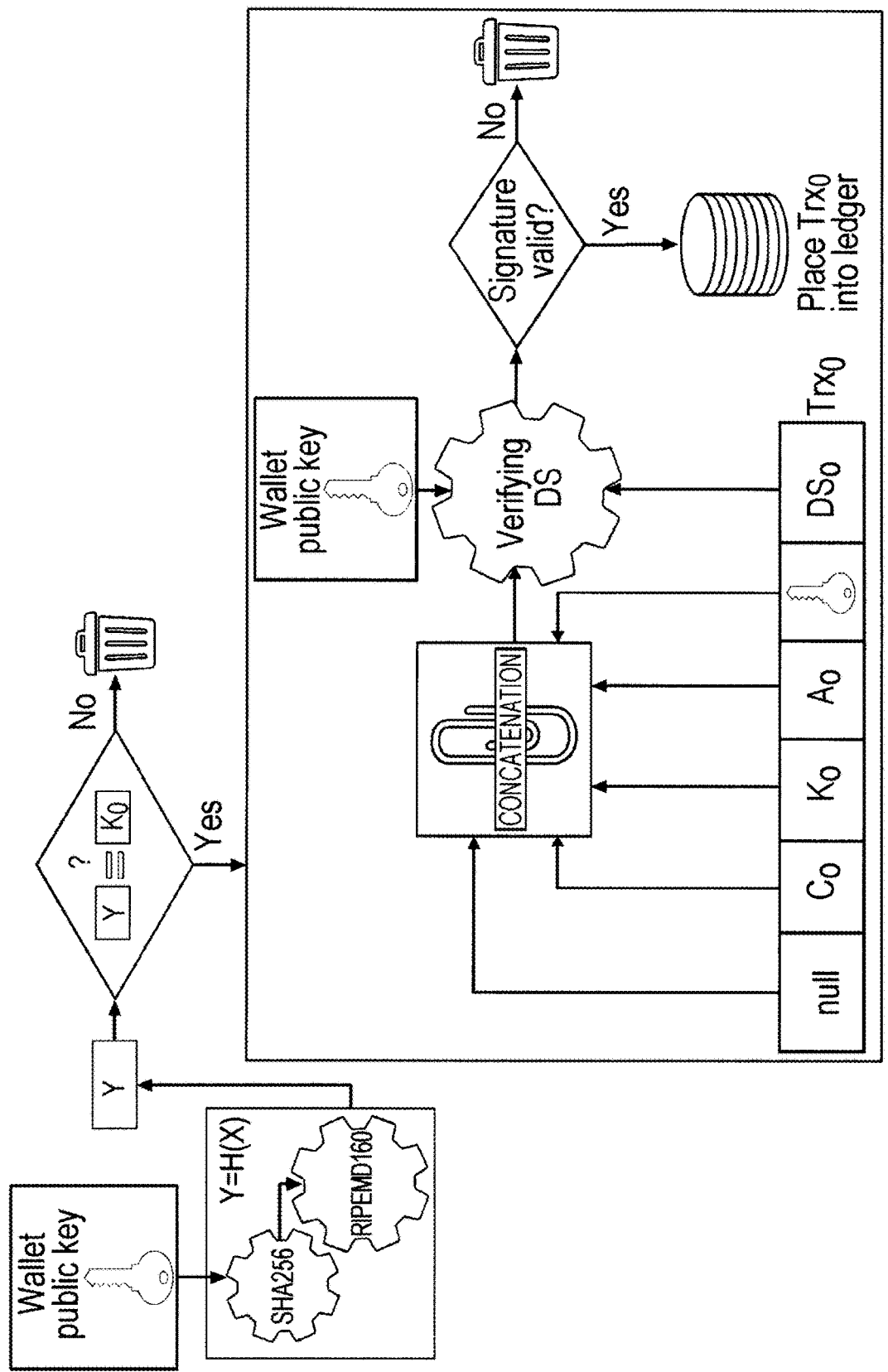
FIG. 12—an illustration of verifying the digital signature for the zeroth transaction.

FIG. 12 illustrates verification of validity of the digital signature of $Trx_0$.

As follows from said figure, concatenation of the data from the first, second, third, fourth, and fifth fields of $Trx_0$ is initially performed, and validity of the digital signature of $Trx_0$, which resides in its sixth field, is then confirmed based on the obtained concatenation and the wallet public key paired with the wallet private key which has been used in generating the digital signature of $Trx_0$. Validity of the digital signature of $Trx_0$ can be verified using a known algorithm which corresponds to the algorithm used in generating said signature.

It is important to appreciate that $Trx_0$ belongs to the type of self-signed transactions. This means that the digital signature is verified using the public key from the fifth field of $Trx_0$, the hash value of which resides in its third field.

3.7.3. Verifying Digital Signature for Non-Zeroth Transactions

In the case of the individual scenario, when verifying validity of the digital signature for $Trx_i$, i>0, concatenation of the data from the first, second, third, fourth, and fifth fields of the $Trx_i$ is first performed, and then validity of the digital signature for $Trx_i$, which resides in its sixth field, is confirmed based on the performed concatenation, the wallet public key, and the service public key from the fifth field of $Trx_i$. Based on the assumption that the data from $Trx_0$ has been already included in the ledger 220 and, therefore, is persistent, the wallet public key can be read from the ledger to perform the verification in question.

As noted above (see Subsection 3.5.2.4), in the case of CDS, there is always only one signature, and if CDS is based on ECDSA, then the resulting signature is comprised of 320 bits. In the case of CDS, one private key can be used to generate the signature, and, hence, one public key can be used to verify it. Thus, one and the same algorithm is used for generating/verifying the signature both in the collective and individual scenarios.

Figure 13:
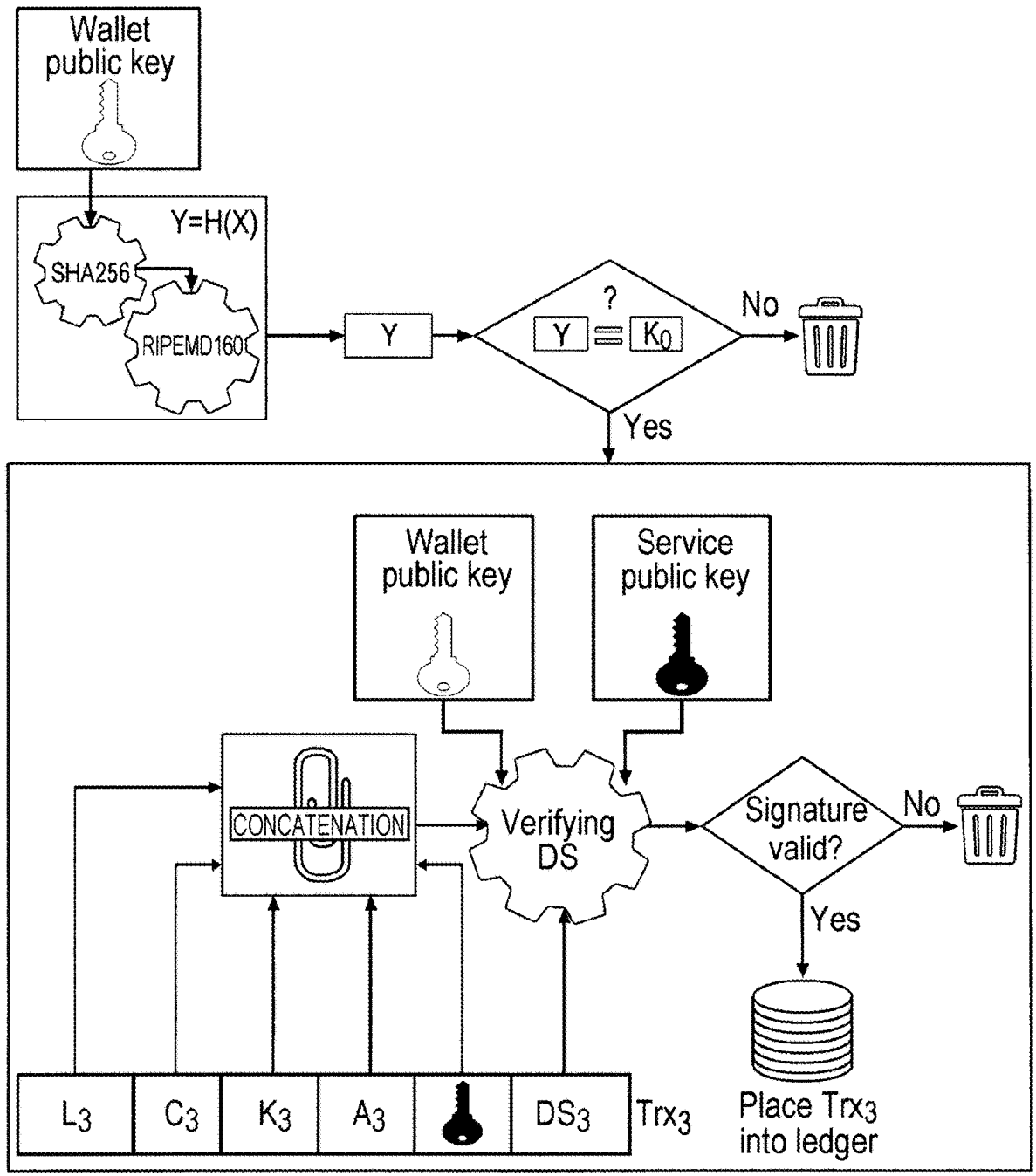
FIG. 13—an illustration of verifying the digital signature for the non-zeroth transaction.

CDS validity verification for the individual scenario is exemplified by $Trx_3$ in FIG. 13.

In the case of the collective scenario, when verifying validity of the digital signature for $Trx_i$, first concatenation of the data from the first, second, third, fourth, and fifth fields of $Trx_i$ and $DS_{trx}$, which resides in its sixth field, is first performed, and then validity of $DS_{wal}$, which also resides in the sixth field of $Trx_i$, is confirmed based on the first concatenation and the wallet public key paired with the wallet private key which has been used to generate $DS_{wal}$. Second concatenation of the data from the first, second, third, fourth, and fifth fields of $Trx_i$ is then performed, and validity of $DS_{trx}$ is confirmed based on the second concatenation and the service public key paired with the service private key which has been used to generate $DS_{wal}$.

According to Subsection 3.5.2.4.3, CDS can be employed not only in the individual scenario, but also in the collective scenario, when two independent signatures are generated, each comprised of 320 bits. As noted above, in this case one and the same algorithm is used for generating/verifying the digital signature.

3.7.4. Verifying Linkability of Transactions

Linkability of $Trx_i$, $i>0$, is generally acknowledged when the check value from the second field of $Trx_{i-1}$, which is preferably read from the ledger 220, matches a value of the combined hash of a concatenation of the link value from the first field of $Trx_i$ and the value of the combined hash of the concatenation of the data from the third, fourth, and fifth fields of $Trx_{i-1}$ which is also preferably read from the ledger 220.

Figure 14:
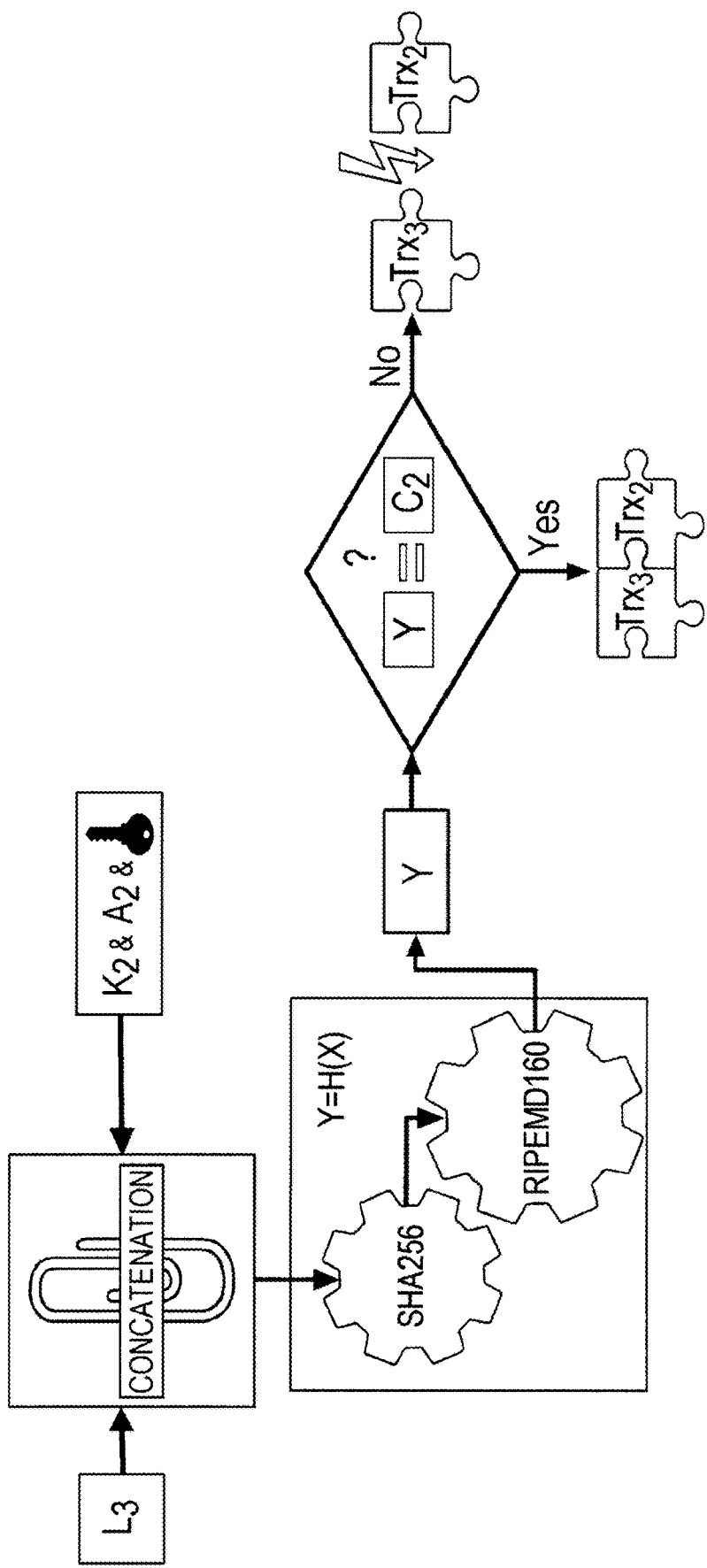
FIG. 14—an illustration of verifying linkability according to an embodiment of the present invention.

The logic of verifying linkability is exemplified by $Trx_3$ and $Trx_2$ in FIG. 14.

As noted previously, the link value resides in the first field of $Trx_3$. The data from the third, fourth, and fifth fields of $Trx_2$ is preliminarily mapped to a 160-bit sequence by means of the combined hash function, as shown in FIG. 7. To confirm linkability, it is necessary to perform concatenation of the link value from $Trx_3$ and the 160-bit image of the data from the third, fourth, and fifth fields of $Trx_2$. The value of the combined hash of the previously performed concatenation is then calculated, and the obtained value is compared with the check value from the second field of $Trx_2$. Equality means that linkability is confirmed, inequality means that unlinkability is detected.

It should be noted that a commission fee is charged from the e-wallet in favor of the verifier for both confirming validity of $DS_{wal}$ and $DS_{trx}$ and confirming linkability.

3.8. Reinitialization

According to the discussion of Subsection 3.4, when performing iterative hashing, for an individual transaction a dedicated series is created the uniqueness of which is defined by the secret seed, as well as by data of the third, fourth, and fifth fields of the transaction. The maximum number of iterations n or, in other words, the maximum length of the series, is fixed for a plurality of transactions with the same secret seed, and the series length reduces by one with each new transaction. The dynamics of input of transactions is hardly predictable; however, finiteness of the series implies that its length will be exhausted at some moment. That is, n iterations are performed at first, then n−1, n−2, and so on up to 2, which corresponds to such exhaustion. Therefore, there is a need to provide for a mechanism for reinitializing the series.

Note that the secret seed used in the iterative transformation for generating the check and link values ensures uniqueness of the plurality of transactions. If the seed is modified, then the check and link values of each transaction from said plurality will change even if the data from its third and fourth fields are unmodified.

Only the check value, the link value, the data from the third, fourth, and fifth transaction fields are used to verify linkability (see Subsection 3.7.4). This means that the method of verification does not depend on the seed. Furthermore, the verifier does not need to know the series length.

Preferably, for steps 502, 602, the value n≥3 (not less than three). Let us denote the secret seed used to generate the check and link values of a current plurality of transactions as r (see Subsection 3.4). Let us introduce variables ChainLength and RandomSeed. Initially ChainLength:=n, RandomSeed:=r. Then execution of the following steps will be required for reinitialization:

1. Prior to generating the check and link values of $Trx_j$, verify ChainLength $\overset{?}{=}$ 2.
2. If ChainLength=2, then RandomSeed:=H(RandomSeed) and ChainLength n, otherwise proceed to 3.
3. Generate the check and link values for $Trx_j$ based on RandomSeed by the algorithm from Subsection 3.4.
4. Set ChainLength:=ChainLength−1.

Since the switch of the seed is not noticeable for the verifier, the public key owner can perform reinitialization at any time at own discretion, e.g. following a certain security policy. It should be also noted that the value of n can be further changed for the same reasons during the reinitialization.

Thus, step 602 is preferably preceded by the above actions 1-2, whereas step 602 itself substantially corresponds to action 3.

4. Analysis of Proposed Approach for Possible Malicious Actions

4.1. Counteraction to Imposition of Improper Key

The definition of an improper ordinary public key in the collective scenario is given in the following manner: it is such a key $\hat{\mathcal{P}}_j$ that an ordinary private key $\hat{S}_j$ paired therewith is unknown. Let the i-th, i>0, transaction, in accordance with the above consideration, consist of the following data set:

1. Link value $\ell_{i-1}$.
2. Check value $c_i$.
3. $\beta_i = \mathcal{H}(\mathcal{P}_i)$.
4. Credentials $d_i$.
5. Service public key $\mathcal{P}_{Tpn}$.
6. $DS_{trx}$: $\{R_i, S_i\}$.
7. $DS_{wal}$.

The unique service key pair $\{\mathcal{S}_{Tpn}, \mathcal{P}_{Tpn}\}$ is employed in each chain for generating/verifying $DS_{trx}$.

An attacker tries to replace $\mathcal{D}_i = \{\mathcal{P}_{Tpn\ i-1}, c_i, \beta_i, d_i, \mathcal{P}_{Tpn}, \{R_i, S_i\}\}$ with fraudulent data $\hat{\mathcal{D}}_j = \{\ell_{j-1}, \hat{c}_j, \hat{\beta}_j, \hat{d}_j, \hat{Y}_j, \{\hat{R}_j, \hat{S}_j\}\}$, $\hat{\beta}_j = \mathcal{H}(\hat{\mathcal{P}}_j)$, $\hat{Y}_j = [\hat{x}_j]G$.

As noted above, $c_i$, $\ell_{i-1}$, and $\{R_i, S_i\}$ are generated within the security perimeter. The data of $\mathcal{D}_i$ is transferred outside the security perimeter for generating $DS_{wal}$ and, hence, is vulnerable to substitution.

Since $\{R_i, S_i\}$=Sign(H($\ell\|c_i\|\beta_i\|d_i\|\mathcal{P}_{Tpn}$), $\mathcal{S}_{Tpn}$), then partial substitution of data in $\mathcal{D}_i$, for example, $\beta_i$ with $\beta_j$, will be reliably detected when verifying $DS_{trx}$.

Verification of the signature $\{R_i, S_i\}$ is carried out using the service public key $\mathcal{P}_{Tpn}$. It is assumed that the attacker will attempt to perform partial substitution of the kind $\hat{\mathcal{D}}_{i,j} = \{\ell_{i-1}, \hat{c}_j, \hat{P}_j, \hat{d}_j, \hat{Y}_j, \{\hat{R}_j, \hat{S}_j\}\}$, where $\{\hat{R}_j, \hat{S}_j\}$=sign(H($\ell_{i-1}\|\hat{c}_j\|\hat{\beta}_j\|\hat{d}_j\|\hat{Y}_j$), $\hat{x}_j$) and $\hat{c}_j \neq c_i$, $\hat{\beta}_j \neq \beta_i$, $\hat{d}_j \neq d_i$, $\hat{x}_j \neq \mathcal{S}_{Tpn}$. If such substitution is not detected, the attacker will be able to embed his or her transaction into a transaction chain of someone else. By construction, the attacker does not know the service private key $\mathcal{S}_{Tpn}$ of an entity being attacked, and, in order to generate the signature, the attacker will be obliged to use his or her own key pair $\{\hat{x}_m, \hat{Y}_j\}$ such that $\hat{Y}_j \neq \mathcal{P}_{\text{трп}}$. Since $DS_{trx}$ of the attacked entity is always generated using the unique key $\mathcal{S}_{\text{трп}}$, whereas $\mathcal{P}_{\text{трп}}$ is stored in the ledger for each transaction, then the substitution of the service public key $\mathcal{P}_{\text{трп}}$ with $\hat{Y}_j$ will be detected from comparing the current public key with public keys from the ledger.

Moreover, the attacker does not know the attacked entity's secret seed r based on which $c_i = \phi(\beta_i, d_i, \mathcal{P}_{\text{трп}}, r)$, $\ell_i = \phi(\beta_i, d_i, \mathcal{P}_{\text{трп}}, r)$ have been generated, and $r \neq \hat{r}$, where $\hat{r}$ is the attacker's secret seed. Let $\hat{c}_j = \phi(\hat{\beta}_j, \hat{d}_j, \hat{Y}_j, \hat{r})$ and $\hat{\ell}_j = \phi(\hat{\beta}_j, \hat{d}_j, \hat{Y}_j, \hat{r})$. By construction, $\hat{c}_j$ and $\hat{\ell}_j$ belong to the unique series with the secret seed $\hat{r}$, and any attempt to use them within a different unique series will be immediately detected. With given $\hat{\beta}_j, \hat{d}_j, \hat{Y}_j$ and unknown r, in order to obtain $\hat{c}_j$ and $\hat{\ell}_j$ belonging to the series having the secret seed r, it is necessary to solve a computationally intensive task with exponential search space, which is virtually unfeasible in practice. Also, due to Property 2 of the iterative transformation (see subsection 1.3), the check value $c_i$ and the link value $\ell_{i-1}$ are not predictable.

Thus, identified unlinkability is indicative of an attacker's activity, including an attempt to substitute the data of $\mathcal{D}_i$.

4.2. Check and Link Values

If the seed is unknown, then the check and link values of each subsequent transaction can not be predicted even if the data of the third, fourth, and fifth fields is known. This follows from Property 2 of the iterative transformation (see subsection 1.3).

In the general case, the method of generating the check value $c_i$ and the link value $\ell_{i-1}$ ensures uniqueness of the both. However, if the data from the third, fourth and fifth fields is not modified upon transitioning from one transaction to another, then the check and link values will match. This case is considered below.

The seed common to all iterative transformations is denoted as $r \in_R \mathbb{F}_2^{160}$, r=const. Let, besides a transaction with number i, a transaction with number j>i and j, i∈N∪0 is also defined. The Boolean expression is entered $$\mathcal{B}_{j,i} = ((\beta_i \neq \beta_j) \wedge (d_i \neq d_j)) \vee ((\beta_i = \beta_j) \wedge (d_i \neq d_j)) \vee ((\beta_i \neq \beta_j) \wedge (d_i = d_j)) \vee ((\beta_i = \beta_j) \wedge (d_i = d_j)).$$

By Construction, we have $$\forall j \neq i+1 \forall \mathcal{B}_{j,i} \Rightarrow c_j \neq \ell_i \qquad (6)$$

Then, $$\exists j = i+1 \forall ((\beta_i = \beta_j) \wedge (d_i = d_j)) \Rightarrow c_j = \ell_i. \qquad (7)$$

Instance (7) implies that the i-th transaction is provided to the pool first, and the transaction, which has number j=i+1 and the data of the third, fourth, and fifth fields of which matches the data of the same fields of the i-th transaction, is placed into the pool immediately thereafter. Then, the data of the first two fields of the j-th transaction will also match. However, since the link value $\ell_i$ is known only to the public key owner and is disclosed at the time of generating the first field of the j-th transaction, the considered case does not have adverse impact on cryptographic strength of the configuration.

If the described case is nevertheless interpreted for some reason as vulnerability, it would be sufficient to modify the seed to resolve this issue. For example, this can be done as follows:

$$r_j = H(r_{j-1}), j = \overline{1,k}$$

In other words, a unique seed obtained by using the iterative transformation is employed in generating the check and link values for each new transaction. $r_0 \in_R \mathbb{F}_2^{160}$ is used as an initial seed. The previous value $r_{j-1}$ may be stored in order to reduce the number of iterations. This substantially implies that $r_j$ is used to generate the data of the first field of the j-th transaction, whereas $r_{j+1} = H(r_j)$ is used to generate the data of the second field of said transaction.

As a consequence, $c'_j = \phi(\beta_j, d_j, \mathcal{P}_{\text{трп}}, r_j)$ and $\ell'_j = \phi(\beta_j, d_j, \mathcal{P}_{\text{трп}}, r_i)$, $r_j \neq r_i$ at $j \neq i$. Then, is $\forall j \neq i \forall \mathcal{B}_{j,i} \Rightarrow c'_j \neq \ell'_i$ is fair.

5. Conclusion

The present application proposes techniques for generating and processing transactions which contain information on public keys and credentials of owners of those keys. The proposed method of linking transactions enables to verify public keys belonging to the same owner. Anyone who has access to the ledger can perform such verification, however, only owners can generate new transactions to be added to existing chains. The public keys themselves can be located anywhere, however, information on each of these keys, in the form of a hash function value, is placed into in the ledger and stored therein intact throughout the entire life cycle.

At the same time, the approach described herein is applicable not only to storing information on public keys. Another specific application thereof is described below.

The instant messaging service is provided in various software platforms in the form of specialized applications, the so-called messengers. Arbitrary (non-sensitive) information is exchanged with such messengers, however, these applications are hardly suitable for communicating financially or legally significant (sensitive) information because of the absence of mechanisms for resolving potential conflicts. However, with development of interactive communication technologies, the demand for sensitive information exchange will only increase.

The present embodiment provides for the capability of using the instant messaging service to make deals and perform other operations which involve mutual accountability of parties. It should be explained herein what the term 'accountability' refers to by the example of a purchase/sale deal. Each of the parties undertakes certain liabilities. For example, in the course of the deal, one of the parties (a seller) undertakes to sell some asset at the firm quote, whereas the other party (a buyer) undertakes to purchase this asset at the offer price. It is obvious that the buyer and/or the seller can subsequently refuse from the purchase/sale, or offer a price different from the one set forth in the offer price. The point at issue herein is substantially in that one of the interacting parties denies the liabilities undertaken by him or her. Such denial causes a conflict and subsequent dispute where each of the parties tries to prove his or her rightness. As a rule, the dispute involves the conflicting parties and an independent arbitrator.

The present embodiment assumes that the deal has been made by exchanging messages through a specialized messenger, and it is contemplated that liability is considered to be undertaken when a message is delivered to a recipient. It should be noted that in the instant messaging being considered, data of various types, such as texts in a natural or formal language over a certain alphabet, as well as photo and video images in a certain format, may be exchanged, in general. Messages themselves can be saved to e.g. a publicly accessible log file, and each party maintains a local copy of the log file. In the case of a conflict, the parties expose messages the semantic content of which discloses the extent of their liabilities. Therefore, the parties try to convince the independent arbitrator that the exposed messages actually occurred, i.e. they were transmitted when making the deal, and their content has not been changed.

In the course of the dispute, it is important to be able to prove the fact of permutation or other violation of the order of messages. The technology of linking transactions provided herein enables to at least confirm/refuse both partial and complete linkability of messages exchanged by the parties through the abovementioned specialized messenger. When using this technology in the considered context, a value of the hash function of a separate message from one of the interacting parties is placed into the third field of each non-zeroth transaction, and metadata of the message (such as time and date of generation of the message, the number of characters, etc.) is placed into its fourth field. The other fields (401-406, 301, 302, 305, 306) of transactions, as well as the operations performed with respect to the transactions in order to link them in a transaction chain (501-505, 601-605) are similar to what has been described above. Then for each of the parties its own transaction chain will be generated. Such a chain enables to precisely determine the sequence of messages.

To confirm/disprove linkability of two messages, which, as may follow from a local copy of the log file submitted by a party, are directly adjacent in the sequence of messages generated by said party, the same verification of linkability as described above with reference to FIG. 14 by the example of $Trx_2$ and $Trx_3$ is employed. Said method can be used to verify linkability for any pair of messages. It is necessary to emphasize here that said verification is only possible for adjacent messages. To confirm linkability of non-adjacent messages, it is necessary to traverse through a chain of intermediate messages and successively confirm linkability for each pair in this chain.

In addition, the transaction chain generated by the described method allows to reliably prove what particular messages were exchanged by the parties during the interaction. The log file in which messages are saved can be tampered; however, in the course of the dispute, by means of submitting the true, untampered log file (one of the parties is always interested in it), said party can readily prove its rightness or falseness of statements of the opposite party. This follows from the property of persistence of data of all respective transactions that is stored in the ledger. The proof reduces to reading a sequence of hash function values from the ledger and comparing them with hash function values calculated from messages from the log file.

In conclusion, it should be noted that computing and communication devices and systems involved in implementation of the proposed technology include well-known hardware, such as processors, memory units, I/O devices, mass storage devices, communication interfaces, etc., and basic software, such as operating systems, protocol stacks, drivers, etc., which can be commercially available or custom. Said devices communicate with each other using known wired and/or wireless communication technologies, including those where public networks are used. The approach described herein is preferably implemented through developing appropriate software with the use of known programming technologies and environments, and by deploying and executing it in respective components of the proposed distributed framework.

It should be appreciated that the embodiments shown are just preferred but not the only possible examples of the present invention. On the contrary, the scope of the invention is defined by the following claims and their equivalents.

The invention claimed is:

1. A computer-implemented method for arranging and storing information as interlinked transactions in a distributed computer framework, the distributed computer framework comprising, at least:

a public pool intended for preliminarily placing transactions thereinto, the pool enabling to modify information present therein, as well as add information thereto and remove information therefrom, a public distributed ledger intended for storing therein records generated based on transactions from the pool, said ledger enabling to both add information thereto and read information therefrom, without any possibility of modifying information in the ledger or removing information from the ledger, all the records in the ledger being blockchain-linked into a chain, wherein transactions included in different records are also linked into logical transaction chains, wherein a root of each transaction chain is a zeroth transaction in the transaction chain, participant computing devices of participants, the participant computing devices being capable of communicating with the pool and the ledger, and at least one verifier computing device responsible for reading transactions from the pool and placing data from the transactions into the ledger;

the method comprising generating a transaction chain by performing steps comprising, at least:

in at least one participant computing device from said participant computing devices, for a zeroth transaction of the transaction chain, wherein the zeroth transaction includes six fields, placing an address of an e-wallet into a third field of the zeroth transaction, the e-wallet address being expressed by a value of a first cryptographic hash function of a wallet public key, wherein the wallet public key is paired with a wallet private key, placing credentials of a wallet owner into a fourth field of the zeroth transaction, and placing the wallet public key into a fifth field of the zeroth transaction, computing a zeroth concatenated value which represents a value of the first hash function of a concatenation of data from the third, fourth, and fifth fields of the zeroth transaction;

performing iterative hashing by means of obtaining a hashing result of a zeroth iteration ($RES^O(0)$) by applying the first hash function to a concatenation of a first secret seed and the zeroth concatenated value, and by means of successively obtaining a hashing result of each k-th iteration ($RES^O(k)$), $0<k \le n$, by applying the first hash function to a concatenation of a hashing result of a (k−1)-th iteration ($RES^O(k-1)$ and the zeroth concatenated value, where n is a maximum number of iterations, performing a zeroth buffering step comprising storing $RES^O(n-1)$ to long-term memory accessible to said at least one participant computing device, placing $RES^O(n)$ as a check value of the zeroth transaction into a second field of the zeroth transaction, computing a digital signature of the zeroth transaction based on data from the first, second, third, fourth, and fifth fields of the zeroth transaction and the wallet private key, and placing the digital signature of the zeroth transaction into a sixth field of the zeroth transaction, placing the zeroth transaction into the pool;
for each i-th, i>0 transaction of the transaction chain, the i-th transaction including six fields,
placing information content of the i-th transaction into a third field and a fourth field of the i-th transaction, the information content having at least partial relation to a first participant, and placing a service public key into a fifth field of the i-th transaction, wherein the service public key is paired with a service private key, said service key pair being the same for the entire transaction chain,
computing an i-th concatenated value which is a value of the first hash function of a concatenation of data from the third, fourth, and fifth fields of the i-th transaction,
performing iterative hashing by means of obtaining a hashing result of a zeroth iteration ($RES^i(0)$) by applying the first hash function to a concatenation of the first secret seed and the i-th concatenated value, and by means of successively obtaining a hashing result of each k-th iteration ($RES^i(k)$), $0<k \leq n-i$, by applying the first hash function to a concatenation of a hashing result of a (k-1)-th iteration ($RES^i(k-1)$) and the i-th concatenated value,
performing an i-th buffering step comprising storing $RES^i$(n−i−1) to the long-term memory,
placing $RES^i(n-i)$ as a check value of the i-th transaction into a second field of the i-th transaction, in case an (i-1)-th buffering step has been performed, reading $RES^{i-1}$(n-i) from the long-term memory, or
computing an (i-1)-th concatenated value, the (i-1)-th concatenated value being a value of the first hash function of a concatenation of data from a third, fourth, and fifth fields of an (i-1)-th transaction, and performing iterative hashing by means of obtaining a hashing result of a zeroth iteration ($RES^{i-1}(0)$) by applying the first hash function to a concatenation of the first secret seed and the (i-1)-th concatenated value, and by means of successively obtaining a hashing result of each k-th iteration ($RES^{i-1}(k)$), $0<k \leq n-i$, by applying the first hash function to a concatenation of a hashing result of a (k-1)-th iteration ($RES^{i-1}(k-1)$) and the (i-1)-th concatenated value,
placing $RES^{i-1}(n-i)$ as a link value of the i-th transaction into a first field of the i-th transaction,
computing a digital signature for the i-th transaction based on data from the first, second, third, fourth, and fifth fields of the i-th transaction, the service private key, and the wallet private key, and placing the digital signature for the i-th transaction into a sixth field of the i-th transaction,
placing the i-th transaction into the pool;
in the verifier computing device,
retrieving the zeroth transaction from the pool, verifying validity of the digital signature of the zeroth transaction, and, if validity of the digital signature of the zeroth transaction is acknowledged, placing the data from the fields of the zeroth transaction into the ledger,
successively retrieving each i-th, i>0, transaction from the pool, and performing verification with respect thereto, the verification comprising:
verifying validity of the digital signature for the i-th transaction, and, if validity of the digital signature for the i-th transaction is acknowledged,
acknowledging linkability of the i-th transaction if a check value from a second field of the (i-1)-th transaction matches a value of the first hash function of a concatenation of the link value from the first field of the i-th transaction and the value of the first hash function of the concatenation of the data from the third, fourth, and fifth fields of the (i-1)-th transaction,
placing the data from the fields of the i-th transaction into the ledger if validity of the digital signature for the i-th transaction and linkability of the i-th transaction are acknowledged.

2. The method of claim 1, wherein the service private key is computed by iterative hashing, the iterative hashing comprising repeatedly applying a second cryptographic hash function to a result of previous hashing, starting from hashing a second secret seed, wherein multipleness of the hashing is defined by a number of different chains of one participant, and each individual hashing determines a service private key for a specific chain, while a public service key paired therewith is computed based on said service private key, wherein the second hash function may differ from the first hash function, and the second secret seed may differ from the first secret seed.

3. The method of claim 1, wherein the computing the digital signature of the zeroth transaction is performed based on applying a predefined cryptographic transformation to the concatenation of the data from the first, second, third, fourth, and fifth fields of the zeroth transaction using the wallet private key.

4. The method of claim 1, wherein said at least one participant computing device is a computing device of the first participant, said first participant possessing the first secret seed, the service private key, and the wallet private key, wherein said computing the digital signature for the i-th transaction is performed by applying a predefined cryptographic transformation to the concatenation of the data from the first, second, third, fourth, and fifth fields of the i-th transaction using the service private key and the wallet private key.

5. A method of claim 1, wherein
said at least one participant computing device comprises a computing device of the first participant and a computing device of a second participant, the first participant being subordinate to the second participant, wherein the first participant possesses the first secret seed and the service private key, while the second participant possesses the wallet private key;
the computing the digital signature for the i-th transaction further comprising:
sending, from the computing device of the first participant to the computing device of the second participant, a request for generating a wallet digital signature ($D_{wal}{}^i$),
in the computing device of the first participant, computing a digital signature of the i-th transaction ($DS_{trx}{}^i$) based on applying a predefined cryptographic transformation to the concatenation of the data from the first, second, third, fourth, and fifth fields of the i-th transaction using the service private key,
in the computing device of the second participant, in response to acceptance of the received request:
verifying validity of $D_{trx}{}^i$ using the service public key, and if validity of $DS_{trx}{}^i$ is acknowledged, computing based on applying the predefined cryptographic transformation to the concatenation of the data from the first, second, third, fourth, and fifth fields of the i-th transaction and $DS_{trx}{}^i$ using the wallet private key;
said placing the digital signature for the i-th transaction into the sixth field of the i-th transaction comprising jointly placing both $DS_{trx}{}^i$ and $DS_{wal}{}^i$ into the sixth field of the i-th transaction.

6. The method of claim 4, further comprising, in the verifier computing device:
prior to said verifying validity of the digital signature of the zeroth transaction retrieved from the pool, comparing the wallet public key from the fifth field of the zeroth transaction and a true wallet public key, the comparing being performed within a secure environment in the verifier computing device, wherein a condition to proceed to said verifying validity of the digital signature of the zeroth transaction is acknowledgement, in said comparing, of identity of the wallet public key from the zeroth transaction to the true wallet public key;
prior to the verifying validity of a digital signature of the first transaction retrieved from the pool, comparing the service public key from a fifth field of the first transaction and a true service public key, said comparing being performed within the secure environment in the verifier computing device, wherein a condition to proceed to said verifying validity of the digital signature for the first transaction is
acknowledgement, in said comparing, of identity of the service public key from the first transaction with the true service public key; and
for each i-th transaction, i>1, retrieved from the pool,
prior to said verifying validity of the digital signature for the i-th transaction, comparing the service public key from the fifth field of the i-th transaction with a service public key read from the ledger, wherein said service key read from the ledger was placed into the ledger from the fifth field of the m-th transaction belonging to said transaction chain, in having any value from 1 to i-1, said comparing being performed within the secure environment in the verifier computing device, wherein a condition to proceed to said verifying validity of the digital signature for the i-th transaction is acknowledgement, in said comparing, of identity of the service public key from the i-th transaction with the service public key read from the ledger.

7. The method of claim 6, wherein
the true public key is retrieved from a data storage, and
a further condition to proceed to the verifying validity of the digital signature for the zeroth transaction, provided identity of the wallet public key from the zeroth transaction to the true wallet public key is acknowledged, is identity of the value from the third field of the zeroth transaction to a value of the first hash function of any of these wallet public keys.

8. The method of claim 6, wherein said verifying validity of the digital signature for the i-th transaction comprises performing concatenation of the data from the first, second, third, fourth, and fifth fields of the i-th transaction, and verifying validity of the digital signature for the i-th transaction based on said concatenation, the wallet public key and the service public key from the fifth field of the i-th transaction.

9. The method of claim 6, wherein
said at least one participant computing device comprises a computing device of the first participant and a computing device of a second participant, the first participant being subordinate to the second participant, wherein the first participant possesses the first secret seed and the service private key, while the second participant possesses the wallet private key;

the computing the digital signature for the i-th transaction further comprising:
sending, from the computing device of the first participant to the computing device of the second participant, a request for generating a wallet digital signature ($DS_{wal}^i$),
in the computing device of the first participant, computing a digital signature of the i-th transaction ($DS_{trx}^i$) based on applying a predefined cryptographic transformation to the concatenation of the data from the first, second, third, fourth, and fifth fields of the i-th transaction using the service private key,
in the computing device of the second participant, in response to acceptance of the received request:
verifying validity of $DS_{trx}^i$ using the service public key, and
if validity of $DS_{trx}^i$ is acknowledged, computing $DS_{wal}^i$ based on applying the predefined cryptographic transformation to the concatenation of the data from the first, second, third, fourth, and fifth fields of the i-th transaction and $DS_{trx}^i$ using the wallet private key;
said placing the digital signature for the i-th transaction into the sixth field of the i-th transaction comprising jointly placing both $DS_{trx}^i$ and $D_{wal}^i$ into the sixth field of the i-th transaction;
wherein said verifying validity of the digital signature for the i-th transaction comprises:
performing first concatenation of the data from the first, second, third, fourth, and fifth fields of the i-th transaction and $DS_{trx}^i$, and verifying validity of $DS_{wal}^i$ based on the first concatenation, and
performing second concatenation of the data from the first, second, third, fourth, and fifth fields of the i-th transaction, and verifying validity of $DS_{trx}^i$ based on the second concatenation and the service public key from the fifth field of the i-th transaction.

10. The method of claim 8, comprising retrieving the wallet public key from the data storage, or reading from the ledger a public key which was placed into the ledger from the fifth field of the zeroth transaction.

11. The method of claim 1, wherein the e-wallet is a specialized account responsible for accruing/spending money, wherein the placing the data from each transaction into the ledger is accompanied by debiting an appropriate commission fee from the e-wallet address.

12. The method of claim 1, wherein n is predefined for the first secret seed, n≥3, wherein the method further comprises, before starting execution of said steps with respect to the i-th, i>0, transaction in said at least one participant computing device, a step of, when (n-i)=2, reinitializing the transaction chain by changing the first secret seed, wherein said reinitializing may further comprise changing n.

13. The method of claim 1, wherein
said information arranged and stored as the interlinked transactions in the distributed computer framework is information on public cryptographic keys,
said participants are owners of key material,
the placing the information content of the i-th transaction into the third and fourth fields of the i-th transaction comprises placing, into the third field of the i-th transaction, a value of the first hash function of an i-th ordinary public key, wherein the i-th ordinary public key is paired with an i-th ordinary private key, and placing, into the fourth field of the i-th transaction, credentials of the first participant who is an owner of the i-th ordinary public/private key pair, wherein said service key pair may be different from any of ordinary key pairs.

14. The method of claim 13, wherein the first hash function is a combined hash function implemented as a combination of cryptographic hash functions $SHA_{256}$ and $RIPEMD_{160}$ as follows:

$y=RIPEMD_{160}(SHA_{256}(x))$, wherein the first secret seed is pseudo-random.

15. The method of claim 14, wherein bitlength of the first, second, and third fields of each transaction is fixed and equals 160 bits, whereas bitlengths of the fourth and sixth fields of each transaction can be variable, wherein the fourth field of each transaction comprises a set of attributes of a respective owner, wherein the first field of the zeroth transaction comprises a null reference.

16. The method of claim 14, wherein
said information arranged and stored as the interlinked transactions in the distributed computer framework is information related to messages being exchanged within a messenger,
said placing the information content of the i-th transaction into the third and fourth fields of the i-th transaction comprises placing a value of the first hash function of an i-th message into the third field of the i-th transaction, and placing metadata of the i-th message into the fourth field of the i-th transaction.

17. A computer-implemented method for arranging and storing information on public cryptographic keys as interlinked transactions in a distributed computer framework,
the distributed computer framework comprising, at least:
a public pool intended for preliminarily placing transactions thereinto, the pool enabling to modify information present therein, as well as add information thereto and remove information therefrom,
a public distributed ledger intended for storing therein records generated based on transactions from the pool, said ledger enabling to both add information thereto and read information therefrom, without any possibility of modifying information in the ledger or removing information from the ledger, all the records in the ledger being blockchain-linked into a chain, wherein transactions included in different records are also linked into logical transaction chains, wherein a root of each transaction chain is a zeroth transaction in the transaction chain,
owner computing devices of key material owners, the owner computing devices being capable of communicating with the pool and the ledger, and
at least one verifier computing device responsible for reading transactions from the pool and placing data from the transactions into the ledger;
the method comprising generating a transaction chain by performing steps comprising, at least:
in at least one owner computing device from said owner computing devices of key material owners,
for a zeroth transaction of the transaction chain, wherein the zeroth transaction includes six fields,
placing an address of an e-wallet into a third field of the zeroth transaction, the e-wallet address being expressed by a value of a first cryptographic hash function of a wallet public key, wherein the wallet public key is paired with a wallet private key, placing credentials of a wallet owner into a fourth field of the zeroth transaction, and placing the wallet public key into a fifth field of the zeroth transaction, computing a zeroth concatenated value which represents a value of the first hash function of a concatenation of data from the third, fourth, and fifth fields of the zeroth transaction;
performing iterative hashing by means of obtaining a hashing result of a zeroth iteration ($RES^0(0)$) by applying the first hash function to a concatenation of a first secret seed and the zeroth concatenated value, and by means of successively obtaining a hashing result of each k-th iteration ($RES^0(k)$), $0<k \le n$, by applying the first hash function to a concatenation of a hashing result of a (k-1)-th iteration ($RES^0(k-1)$) and the zeroth concatenated value, where n is a maximum number of iterations,
performing a zeroth buffering step comprising storing $RES^0(n-1)$ to long-term memory accessible to said at least one owner computing device,
placing $RES^0(n)$ as a check value of the zeroth transaction into a second field of the zeroth transaction,
computing a digital signature of the zeroth transaction based on data from the first, second, third, fourth, and fifth fields of the zeroth transaction and the wallet private key, and placing the digital signature of the zeroth transaction into a sixth field of the zeroth transaction,
placing the zeroth transaction into the pool;
for each i-th, i>0 transaction of the transaction chain, the i-th transaction including six fields,
placing, into a third field of the i-th transaction, a value of the first hash function of an i-th ordinary public key, wherein the i-th ordinary public key is paired with an i-th ordinary private key, placing, into a fourth field of the i-th transaction, credentials of a first owner who is an owner of the i-th ordinary public/private key pair, and placing a service public key into a fifth field of the i-th transaction, wherein the service public key is paired with a service private key, said service key pair being the same for the entire transaction chain,
computing an i-th concatenated value which is a value of the first hash function of a concatenation of data from the third, fourth, and fifth fields of the i-th transaction,
performing iterative hashing by means of obtaining a hashing result of a zeroth iteration ($RES^i(0)$) by applying the first hash function to a concatenation of the first secret seed and the i-th concatenated value, and by means of successively obtaining a hashing result of each k-th iteration ($RES^i(k)$), $0<k \le n-i$, by applying the first hash function to a concatenation of a hashing result of a (k-1)-th iteration ($RES^i(k-1)$) and the i-th concatenated value,
performing an i-th buffering step comprising storing $RES^i(n-i-1)$ to the long-term memory,
placing $RES^i(n-i)$ as a check value of the i-th transaction into a second field of the i-th transaction,
in case an (i-1)-th buffering step has been performed, reading $RES^{i-1}(n-i)$ from the long-term memory, or
computing an (i-1)-th concatenated value, the (i-1)-th concatenated value being a value of the first hash function of a concatenation of data from a third, fourth, and fifth fields of an (i-1)-th transaction, and performing iterative hashing by means of obtaining a hashing result of a zeroth iteration $RES^{i-1}(0)$) applying the first hash function to a concatenation of the first secret seed and the (i-1)-th concatenated value, and by means of successively obtaining a hashing result of each k-th iteration ($RES^{i-1}(k)$), $0<k \le n-i$, by applying the first hash function to a concatenation of a hashing result of a (k-1)-th iteration ($RES^{i-1}(k-1)$) and the (i-1)-th concatenated value, placing $RES^{i-1}(n-i)$ as a link value of the i-th transaction into a first field of the i-th transaction, computing a digital signature for the i-th transaction based on data from the first, second, third, fourth, and fifth fields of the i-th transaction, the service private key, and the wallet private key, and placing the digital signature for the i-th transaction into a sixth field of the i-th transaction, placing the i-th transaction into the pool;

in the verifier computing device, retrieving the zeroth transaction from the pool, verifying validity of the digital signature of the zeroth transaction, and, if validity of the digital signature of the zeroth transaction is acknowledged, placing the data from the fields of the zeroth transaction into the ledger, successively retrieving each i-th, i>0, transaction from the pool, and performing verification with respect thereto, the verification comprising:

verifying validity of the digital signature for the i-th transaction, and, if validity of the digital signature for the i-th transaction is acknowledged, acknowledging linkability of the i-th transaction if a check value from a second field of the (i-1)-th transaction matches a value of the first hash function of a concatenation of the link value from the first field of the i-th transaction and the value of the first hash function of the concatenation of the data from the third, fourth, and fifth fields of the (i-1)-th transaction, placing the data from the fields of the i-th transaction into the ledger if validity of the digital signature for the i-th transaction and linkability of the i-th transaction are acknowledged.

18. The method of claim 17, wherein the first hash function is a combined hash function implemented as a combination of cryptographic hash functions $SHA_{256}$ and $RIPEMD_{160}$ as follows:

$y=RIPEMD_{160}(SHA_{256}(x))$, wherein the first secret seed is pseudo-random, and wherein said service key pair may differ from any of ordinary key pairs.

19. The method of claim 18, wherein bitlength of the first, second, and third fields of each transaction is fixed and equals 160 bits, whereas bitlengths of the fourth and sixth fields of each transaction can be variable, wherein the fourth field of each transaction comprises a set of attributes of a respective owner, wherein the first field of the zeroth transaction comprises a null reference.

20. A distributed computer framework for arranging and storing information on public cryptographic keys as interlinked transactions, the distributed computer framework comprising:

a public pool intended for preliminarily placing transactions thereinto, the pool enabling to modify information present therein, as well as add information thereto and remove information therefrom, a public distributed ledger intended for storing therein records generated based on transactions from the pool, said ledger enabling to both add information thereto and read information therefrom, without any possibility of modifying information in the ledger or removing information from the ledger, all the records in the ledger being linked into a chain by the blockchain technology, wherein transactions included in different records are also linked into logical transaction chains, wherein a root of each transaction chain is a zeroth transaction in the transaction chain, owner computing devices of key material owners, the owner computing devices being capable: of communicating with the pool and the ledger, and at least one verifier computing device responsible for reading transactions from the pool and placing data from the transactions into the ledger;

wherein, to generate a transaction chain, at least one owner computing device from said owner computing devices of key material owners is configured to:

for a zeroth transaction of the transaction chain, wherein the zeroth transaction includes six fields, place an address of an e-wallet into a third field of the zeroth transaction, the e-wallet address being expressed by a value of a first cryptographic hash function of a wallet public key, wherein the wallet public key is paired with a wallet private key, place credentials of a wallet owner into a fourth field of the zeroth transaction, and place the wallet public key into a fifth field of the zeroth transaction, compute a zeroth concatenated value which represents a value of the first hash function of a concatenation of data from the third, fourth, and fifth fields of the zeroth transaction;

perform iterative hashing by means of obtaining a hashing result of a zeroth iteration ($RES^0(0)$) by applying the first hash function to a concatenation of a first secret seed and the zeroth concatenated value, and by means of successively obtaining a hashing result of each k-th iteration ($RES^0(k)$), $0<k\le n$, by applying the first hash function to a concatenation of a hashing result of a (k-1)-th iteration ($RES^0(k-1)$) and the zeroth concatenated value, where n is a maximum number of iterations, perform a zeroth buffering operation comprising storing $RES^0(n-1)$ to long-term memory accessible to said at least one owner computing device, place $RES^0(n)$ as a check value of the zeroth transaction into a second field of the zeroth transaction, compute a digital signature of the zeroth transaction based on data from the first, second, third, fourth, and fifth fields of the zeroth transaction and the wallet private key, and place the digital signature of the zeroth transaction into a sixth field of the zeroth transaction, place the zeroth transaction into the pool;

for each i-th, i>0 transaction of the transaction chain, the i-th transaction including six fields, place, into a third field of the i-th transaction, a value of the first hash function of an i-th ordinary public key, wherein the i-th ordinary public key is paired with an i-th ordinary private key, place, into a fourth field of the i-th transaction, credentials of a first owner who is an owner of the i-th ordinary public/private key pair, and place a service public key into a fifth field of the i-th transaction, wherein the service public key is paired with a service private key, said service key pair being the same for the entire transaction chain, compute an i-th concatenated value which is a value of the first hash function of a concatenation of data from the third, fourth, and fifth fields of the i-th transaction, perform iterative hashing by means of obtaining a hashing result of a zeroth iteration ($RES^i(0)$) by applying the first hash function to a concatenation of the first secret seed and the i-th concatenated value, and by means of successively obtaining a hashing result of each k-th iteration ($RES^i(k)$), $0 < k \leq n-i$, by applying the first hash function to a concatenation of a hashing result of a (k-1)-th iteration ($RES^i(k-1)$) and the i-th concatenated value, perform an i-th buffering operation comprising storing $RES^i(n-i-1)$ to the long-term memory, place $RES^i(n-i)$ as a check value of the i-th transaction into a second field of the i-th transaction, in case an (i-1)-th buffering operation has been performed, read $RES^{i-1}(n-i)$ from the long-term memory, or compute an (i-1)-th concatenated value, the (i-1)-th concatenated value being a value of the first hash function of a concatenation of data from a third, fourth, and fifth fields of an (i-1)-th transaction, and perform iterative hashing by means of obtaining a hashing result of a zeroth iteration ($RES^{i-1}(0)$) by applying the first hash function to a concatenation of the first secret seed and the (i-1)-th concatenated value, and by means of successively obtaining a hashing result of each k-th iteration ($RES^{i-1}(k)$), $0 < k \leq n-i$, by applying the first hash function to a concatenation of a hashing result of a (k-1)-th iteration ($RES^{i-1}(k-1)$) and the (i-1)-th concatenated value, place $RES^{i-1}(n-i)$ as a link of the transaction into a first field of the i-th transaction, compute a digital signature for the i-th transaction based on data from the first, second, third, fourth, and fifth fields of the i-th transaction, the service private key, and the wallet private key, and place the digital signature for the i-th transaction into a sixth field of the i-th transaction, place the i-th transaction into the pool;

the verifier computing device is configured to:

retrieve the zeroth transaction from the pool, verify validity of the digital signature of the zeroth transaction, and, if validity of the digital signature of the zeroth transaction is acknowledged, place the data from the fields of the zeroth transaction into the ledger, successively retrieve each i-th, $i > 0$, transaction from the pool, and perform verification with respect thereto, the verification comprising:

verifying validity of the digital signature for the i-th transaction, and, if validity of the digital signature for the i-th transaction is acknowledged, acknowledging linkability of the i-th transaction if a check value from a second field of the (i-1)-th transaction matches a value of the first hash function of a concatenation of the link value from the first field of the i-th transaction and the value of the first hash function of the concatenation of the data from the third, fourth, and fifth fields of the (i-1)-th transaction, place the data from the fields of the i-th transaction into the ledger if validity of the digital signature for the i-th transaction and linkability of the i-th transaction are acknowledged.

* * * * *